US012726110B2

(12) United States Patent
Ishikawa et al.

(10) Patent No.: US 12,726,110 B2
(45) Date of Patent: Sep. 1, 2026

(54) POWER CONVERSION DEVICE FOR SUPPRESSING OVERVOLTAGE DURING POWER ON

(71) Applicant: Mitsubishi Electric Corporation, Tokyo (JP)

(72) Inventors: Shuta Ishikawa, Tokyo (JP); Hajime Toyoda, Tokyo (JP); Koyo Matsuzaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 250 days.

(21) Appl. No.: 18/570,075

(22) PCT Filed: Jun. 21, 2021

(86) PCT No.: PCT/JP2021/023333
§ 371 (c)(1),
(2) Date: Dec. 14, 2023

(87) PCT Pub. No.: WO2022/269662
PCT Pub. Date: Dec. 29, 2022

(65) Prior Publication Data
US 2024/0283372 A1 Aug. 22, 2024

(51) Int. Cl.
*H02M 1/32* (2007.01)
*H02M 1/36* (2007.01)
*H02M 7/219* (2006.01)

(52) U.S. Cl.
CPC ............... *H02M 1/36* (2013.01); *H02M 1/32* (2013.01); *H02M 7/219* (2013.01)

(58) Field of Classification Search
CPC .................................................... H02M 1/322
See application file for complete search history.

(56) References Cited

U.S. PATENT DOCUMENTS 6,169,444 B1 * 1/2001 Thurber, Jr. ............ H02M 3/07 327/540
2010/0007361 A1 * 1/2010 Yamanaka ............. H02M 7/06 324/678

(Continued)

FOREIGN PATENT DOCUMENTS

JP 2014-033553 A 2/2014
JP 5665649 B2 2/2015

(Continued)

OTHER PUBLICATIONS

International Search Report and Written Opinion mailed on Aug. 31, 2021, received for PCT Application PCT/JP2021/023333, filed on Jun. 21, 2021, 9 pages including English Translation.

(Continued)

*Primary Examiner* — Peter M Novak
(74) *Attorney, Agent, or Firm* — XSENSUS LLP

(57) ABSTRACT

This power conversion device includes a rectification circuit which rectifies input voltage from the AC power supply; a leg circuit having an upper leg composed of semiconductor elements connected in series and a lower leg composed of semiconductor elements connected in series, the upper leg and the lower leg being connected in series, at least the semiconductor elements in the lower leg being switching elements; a balance resistor connected in parallel to the semiconductor elements; at least one charge/discharge capacitor connected between a connection point of the semiconductor elements in the upper leg and a connection point of the semiconductor elements in the lower leg; a smoothing capacitor connected to an output of the leg circuit; and an inrush preventing circuit provided between the AC power supply and the leg circuit, and including a current limiting resistor.

8 Claims, 28 Drawing Sheets

(56) References Cited

U.S. PATENT DOCUMENTS

| | | | | |
|---|---|---|---|---|
| 2018/0062557 | A1* | 3/2018 | Tao | H02P 29/024 |
| 2020/0287463 | A1 | 9/2020 | Ishikawa et al. | |
| 2021/0135592 | A1 | 5/2021 | Tsuboka | |
| 2021/0344277 | A1 | 11/2021 | Toyoda et al. | |
| 2022/0294362 | A1* | 9/2022 | Liu | H02M 1/32 |

FOREIGN PATENT DOCUMENTS

| | | | |
|---|---|---|---|
| JP | 6529707 | B1 | 6/2019 |
| JP | 6551041 | B2 | 7/2019 |
| WO | 2019/123716 | A1 | 6/2019 |
| WO | 2019/224863 | A1 | 11/2019 |
| WO | 2020/121469 | A1 | 6/2020 |

OTHER PUBLICATIONS

Notice of Reasons for Refusal mailed on Mar. 8, 2022, received for JP Application 2022-505624, 4 pages including English Translation.

* cited by examiner 1000
10
LOAD
8
7
6
5
4
2
1

LOAD
10
8
7
61
62
63
64
6a
100
5a
51
52
53
54
4a
41
42
9
CONTROLLER
3
21
22
2
1a

FIG. 4
FIG. 4A
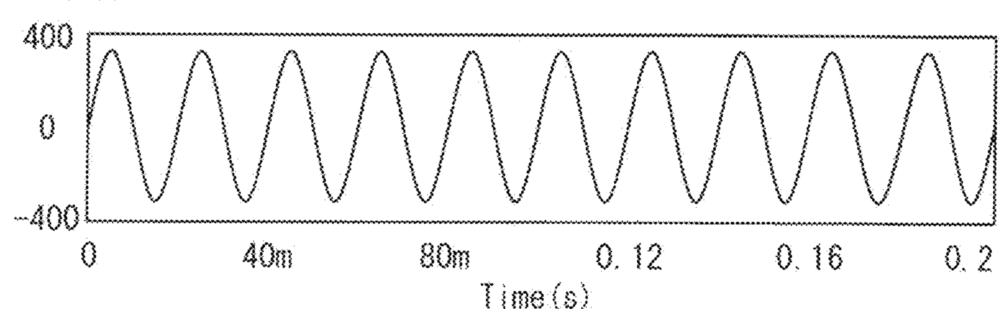
FIG. 4B
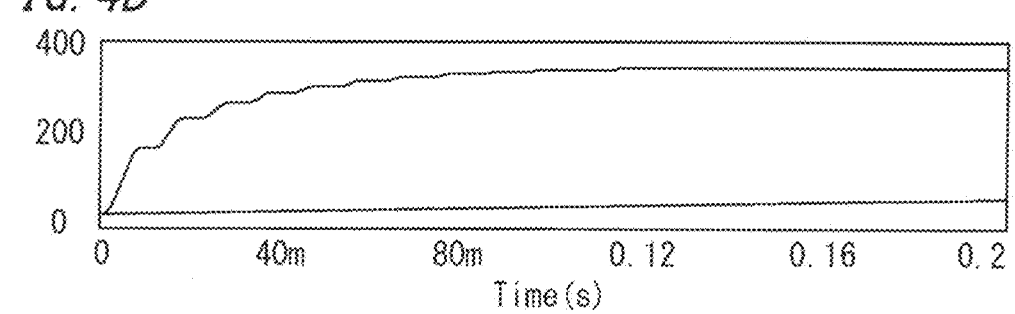
FIG. 4C
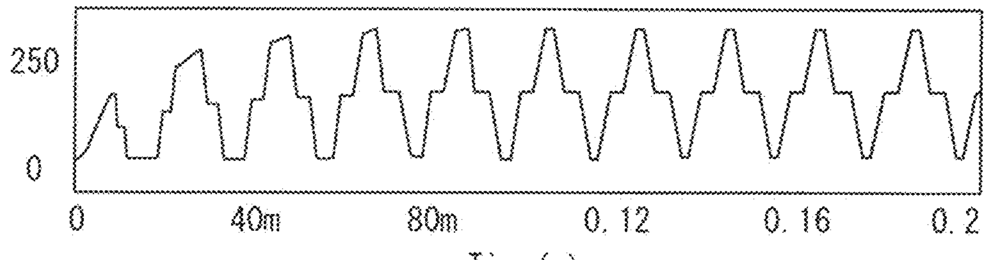
FIG. 4D
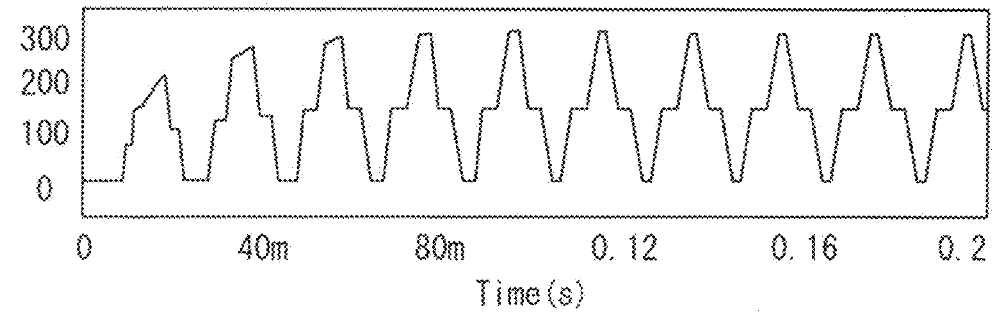

FIG. 9
FIG. 9A
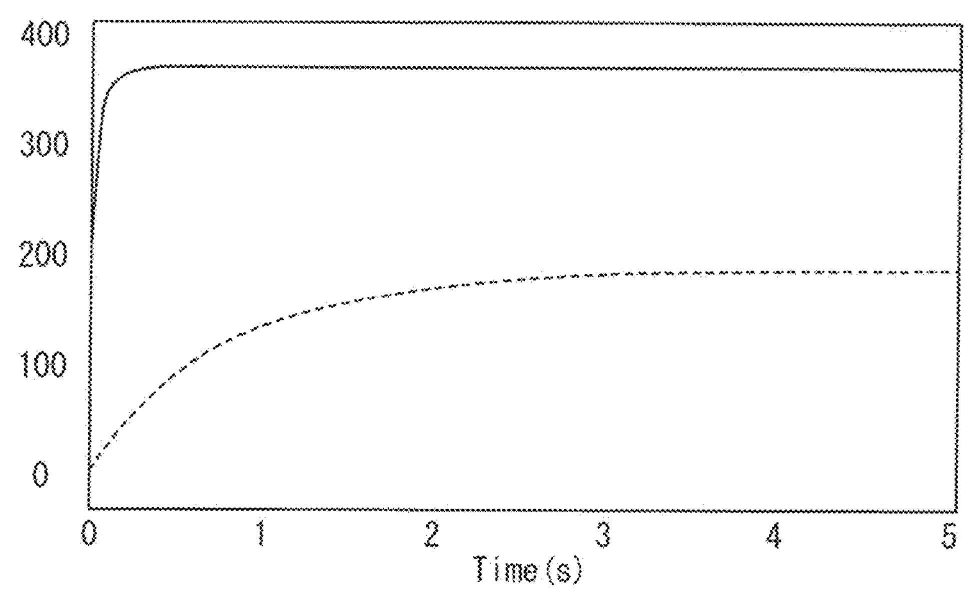
FIG. 9B
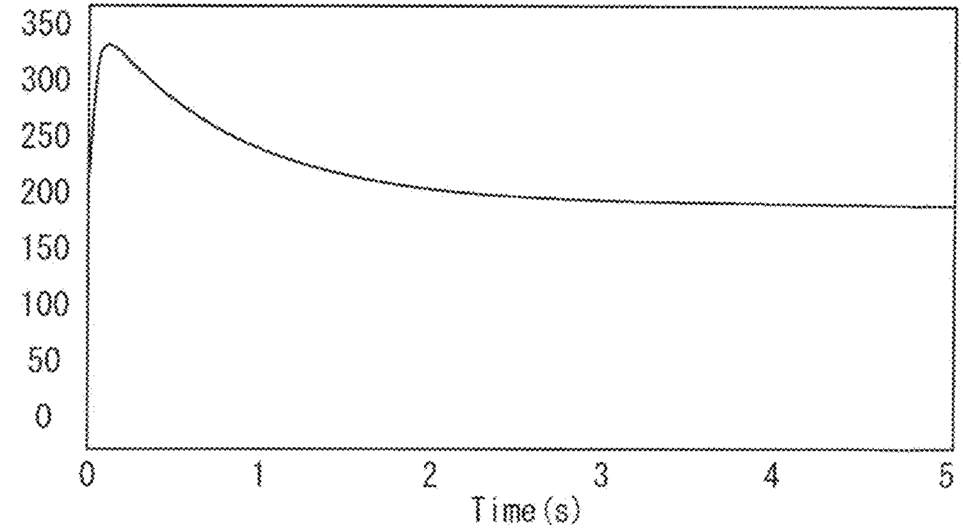

350
300
250
200
150
100
50
0
0
1
2
3
4
5
Time (s)

FIG. 11
FIG. 11A
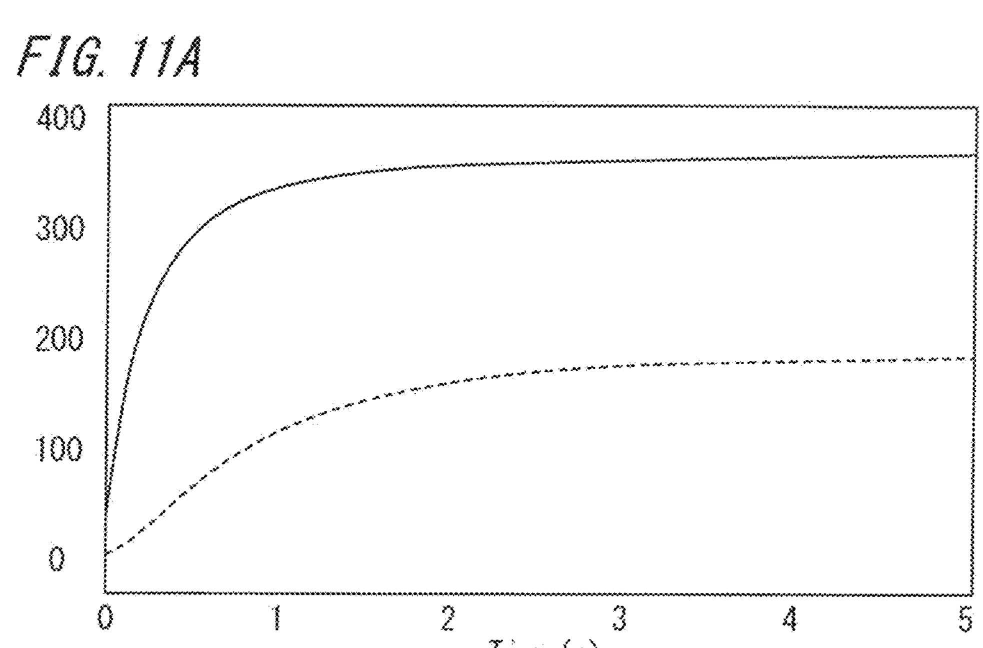
FIG. 11B
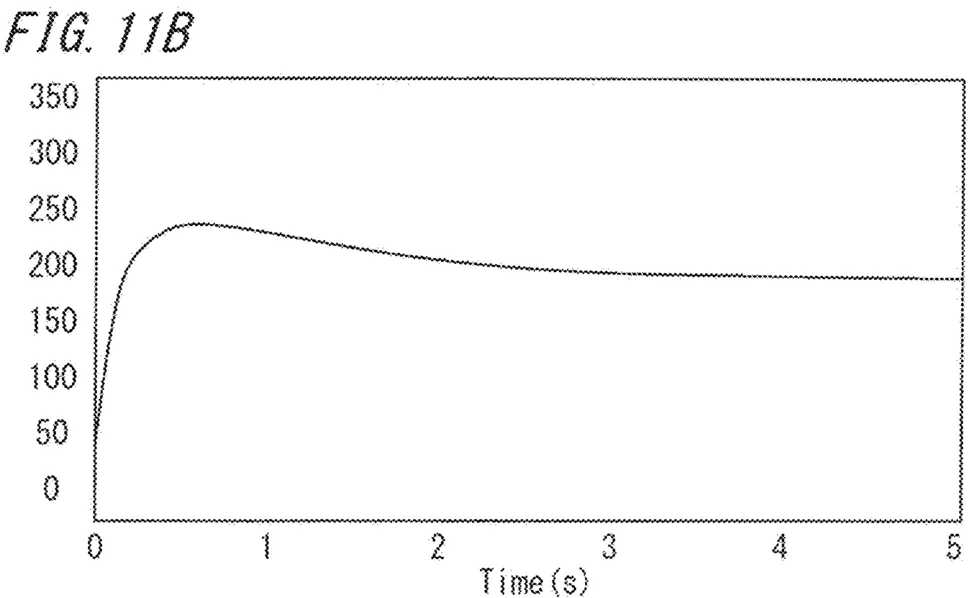

FIG. 12
FIG. 12A
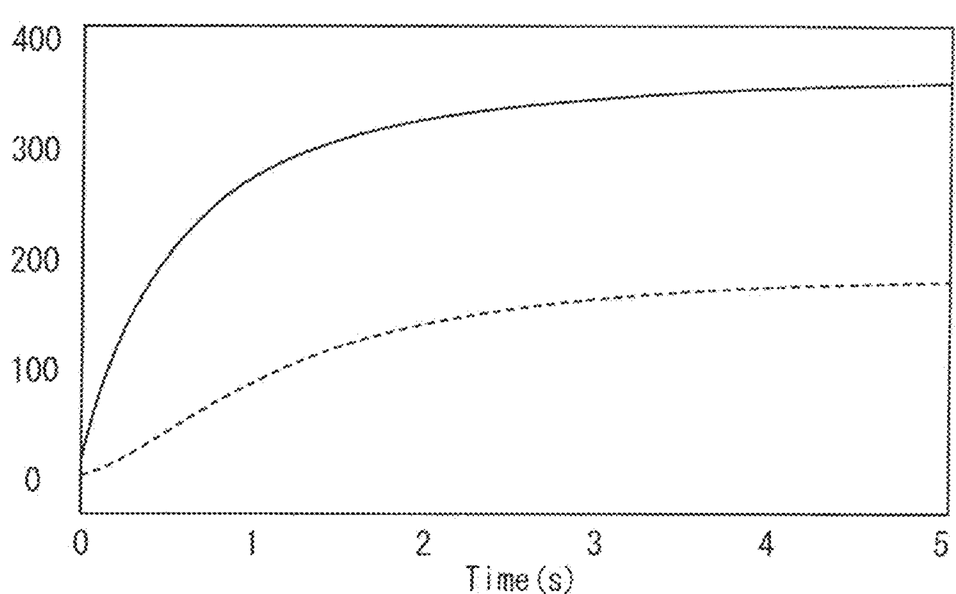
FIG. 12B
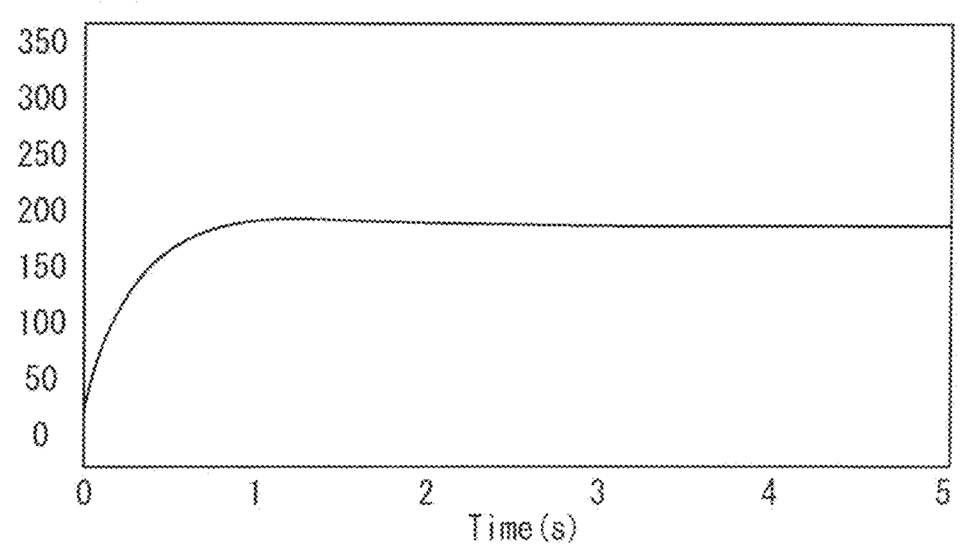

LOAD
CONTROLLER
10
8
7
61
62
63
64
6a
5a
51
52
53
54
300
9
3
2
21
22
4c
1b

LOAD
CONTROLLER
10
8
7
61
62
63
64
6a
9
5b
51a
52a
53
54
301
3
2
21
22
4c
1b

FIG. 20
FIG. 20A
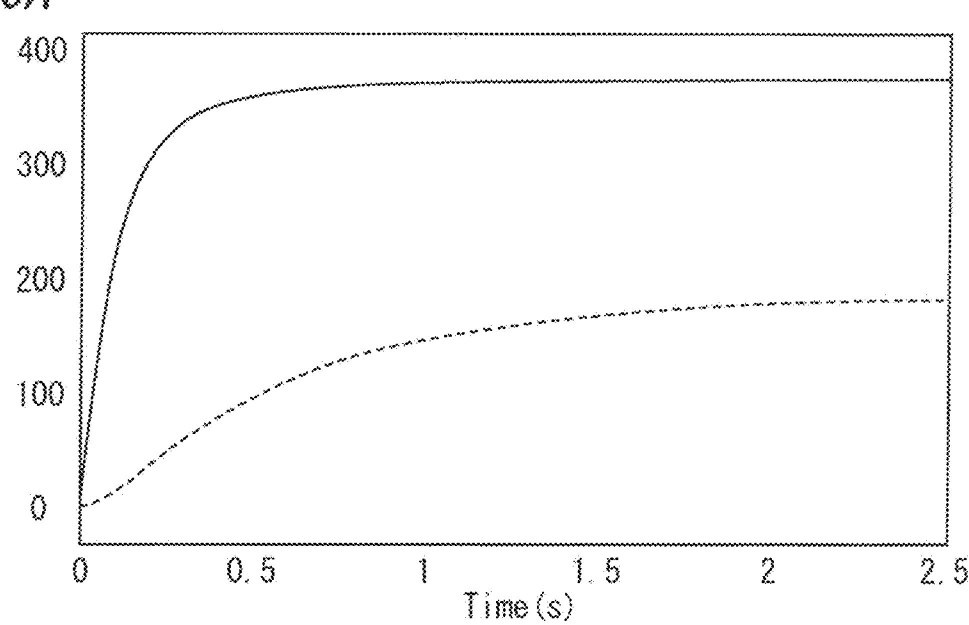
FIG. 20B
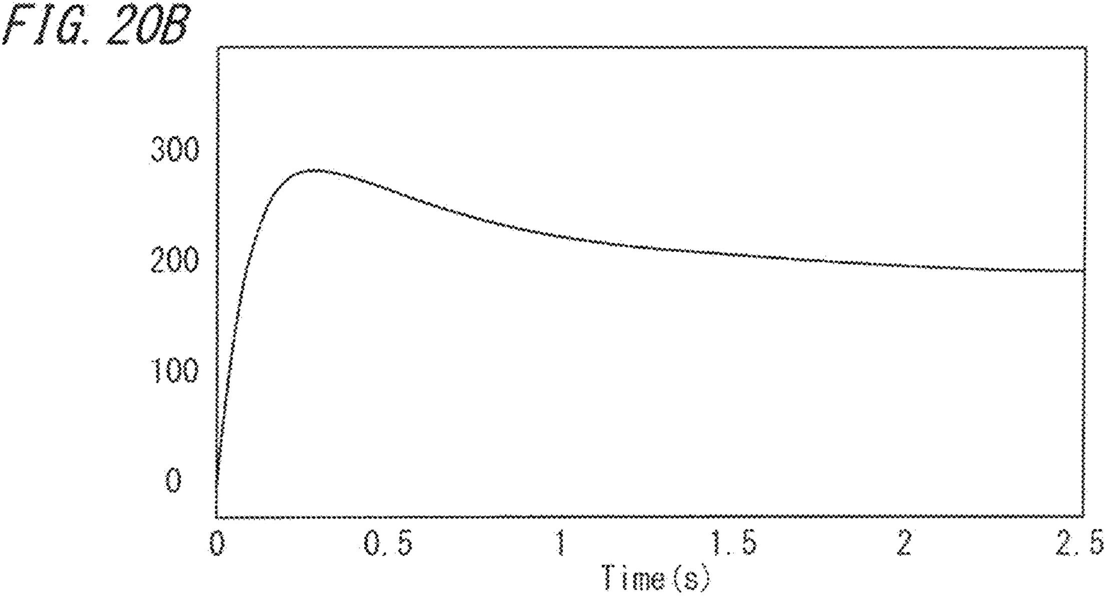

FIG. 21
FIG. 21A
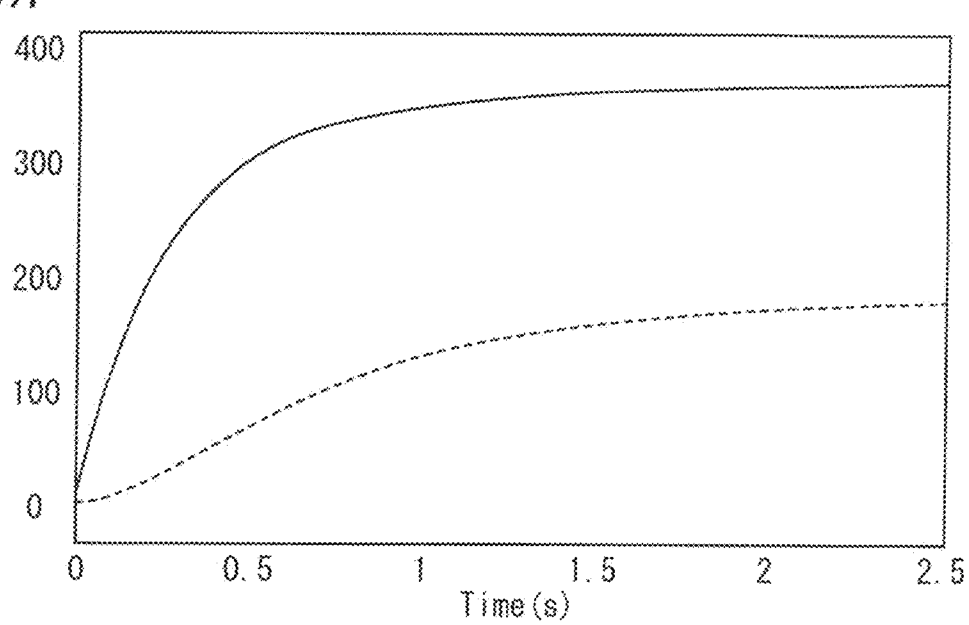
FIG. 21B
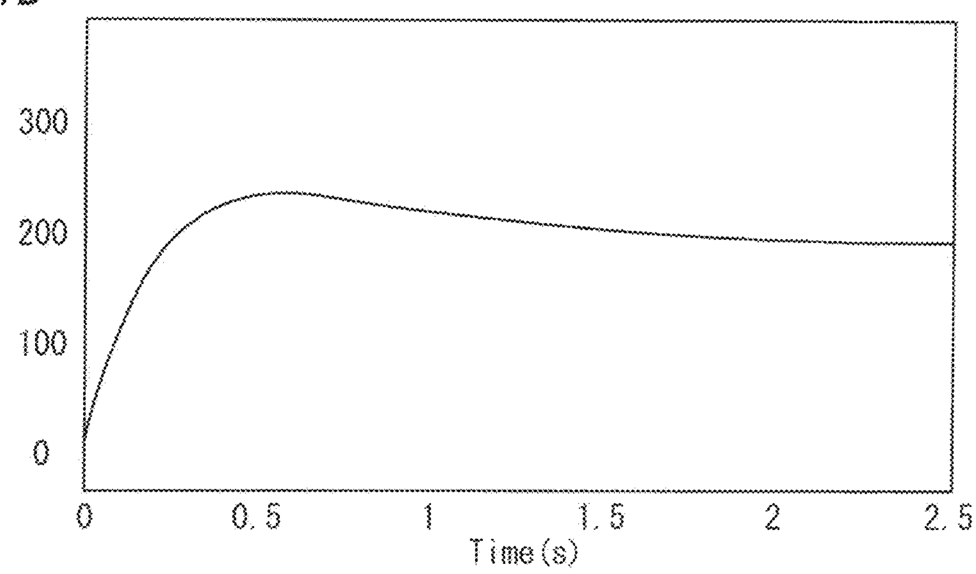

FIG. 22
FIG. 22A
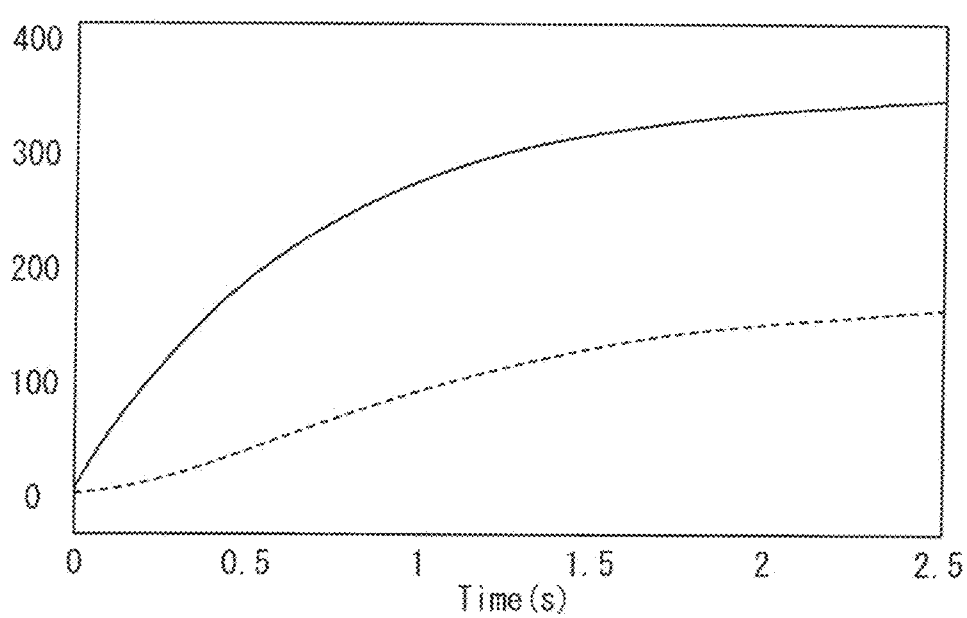
FIG. 22B
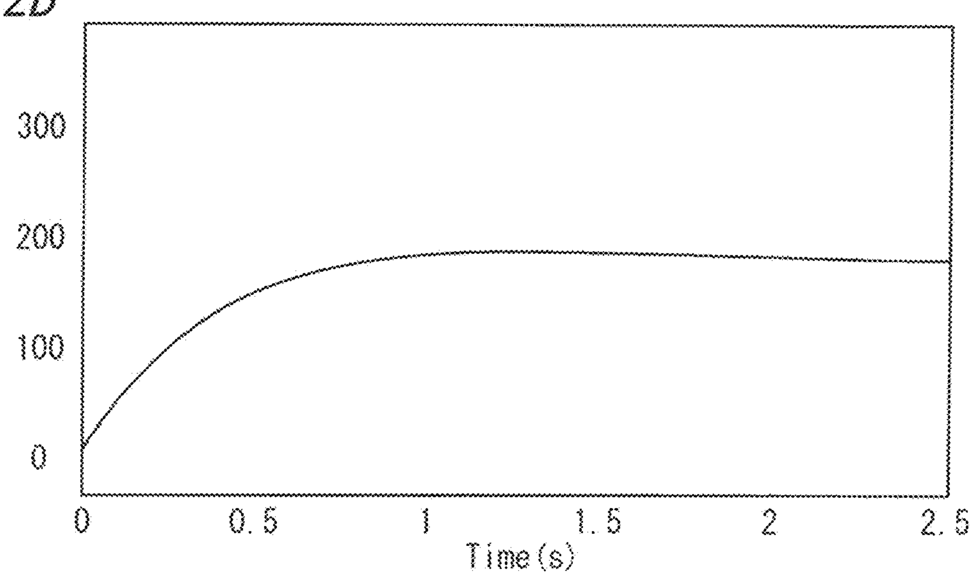

LOAD
CONTROLLER
10
8
7
6b
61
65
64
9
400
5a
51
52
53
54
4a
41
42
3
2
21
22
1a

LOAD
CONTROLLER
10
8
7a
7
66
61
62
63
64
67
6c
500
5c
56
51
52
53
54
57
9
4a
41
42
3
21
22
2
1a

FIG. 27

POWER CONVERSION DEVICE FOR SUPPRESSING OVERVOLTAGE DURING POWER ON

CROSS-REFERENCE TO RELATED APPLICATION

This application is based on PCT filing PCT/JP2021/023333, filed Jun. 21, 2021, the entire contents of which are incorporated herein by reference.

TECHNICAL FIELD

The present disclosure relates to a power conversion device.

BACKGROUND ART

As a high-efficiency circuit configuration of a power converter, a power conversion device that outputs multilevel DC power using charging/discharging of a charge/discharge capacitor is known. In the multilevel converter, voltage applied to each semiconductor element in a non-steady state does not become half of DC bus voltage, and therefore there is a problem that a low-withstanding-voltage element cannot be applied.

For this problem, disclosed is a power conversion device that includes a reactor connected to a DC power supply on the input side, switching elements, a charge/discharge capacitor to be charged/discharged through ON/OFF operation of the switching elements, diodes for providing a charge/discharge path, balance resistors connected in parallel to the switching elements and the diodes, and an output voltage smoothing capacitor (for example, Patent Document 1).

CITATION LIST

Patent Document

Patent Document 1: Japanese Laid-Open Patent Publication No. 2014-33553

SUMMARY OF THE INVENTION

Problem to be Solved by the Invention

In the power conversion device in Patent Document 1, overvoltage can be suppressed in a stopped state, but there is a problem that overvoltage is applied to the semiconductor element during initial charging when the power supply is turned on.

The present disclosure has been made to solve the above problem, and an object of the present disclosure is to provide a power conversion device that can suppress overvoltage during initial charging when a power supply is turned on, during operation, and in a stopped state.

Means to Solve the Problem

A power conversion device according to the present disclosure includes a rectification circuit which is connected to an AC power supply and rectifies input voltage from the AC power supply; a leg circuit connected to the rectification circuit and having an upper leg composed of a plurality of semiconductor elements connected in series and a lower leg composed of a plurality of semiconductor elements connected in series, the upper leg and the lower leg being connected in series, at least the plurality of semiconductor elements in the lower leg being switching elements; a balance resistor connected in parallel to the semiconductor elements of the leg circuit; at least one charge/discharge capacitor connected between a connection point of the semiconductor elements in the upper leg and a connection point of the semiconductor elements in the lower leg; a smoothing capacitor connected to an output of the leg circuit; and an inrush preventing circuit provided between the AC power supply and the leg circuit, and including a current limiting resistor.

Effect of the Invention

The power conversion device according to the present disclosure can suppress overvoltage during initial charging when a power supply is turned on, during operation, and in a stopped state.

BRIEF DESCRIPTION OF THE DRAWINGS

FIG. 4A shows operation waveforms during initial charging in the comparative example of the power conversion device according to embodiment 1. FIG. 4B shows operation waveforms during initial charging in the comparative example of the power conversion device according to embodiment 1. FIG. 4C shows operation waveforms during initial charging in the comparative example of the power conversion device according to embodiment 1. FIG. 4D shows operation waveforms during initial charging in the comparative example of the power conversion device according to embodiment 1.

FIG. 9A shows operation waveforms during initial charging with respect to change in an overvoltage degree index in the power conversion device according to embodiment 1. FIG. 9B shows operation waveforms during initial charging with respect to change in an overvoltage degree index in the power conversion device according to embodiment 1.

FIG. 11A shows operation waveforms during initial charging with respect to change in the overvoltage degree index in the power conversion device according to embodiment 1. FIG. 11B shows operation waveforms during initial charging with respect to change in the overvoltage degree index in the power conversion device according to embodiment 1.

FIG. 12A shows operation waveforms during initial charging with respect to change in the overvoltage degree index in the power conversion device according to embodiment 1. FIG. 12B shows operation waveforms during initial charging with respect to change in the overvoltage degree index in the power conversion device according to embodiment 1.

FIG. 19A shows operation waveforms during initial charging with respect to change in the overvoltage degree index in the power conversion device according to embodiment 3. FIG. 19B shows operation waveforms during initial charging with respect to change in the overvoltage degree index in the power conversion device according to embodiment 3.

FIG. 20A shows operation waveforms during initial charging with respect to change in the overvoltage degree index in the power conversion device according to embodiment 3. FIG. 20B shows operation waveforms during initial charging with respect to change in the overvoltage degree index in the power conversion device according to embodiment 3.

FIG. 21A shows operation waveforms during initial charging with respect to change in the overvoltage degree index in the power conversion device according to embodiment 3. FIG. 21B shows operation waveforms during initial charging with respect to change in the overvoltage degree index in the power conversion device according to embodiment 3.

FIG. 22A shows operation waveforms during initial charging with respect to change in the overvoltage degree index in the power conversion device according to embodiment 3. FIG. 22B shows operation waveforms during initial charging with respect to change in the overvoltage degree index in the power conversion device according to embodiment 3.

FIG. 27 is a graph in which maximum voltage applied to the semiconductor switching element is plotted with respect to change in the overvoltage degree index in the power conversion device according to embodiment 5.

DESCRIPTION OF EMBODIMENTS

Embodiment 1

Embodiment 1 relates to a power conversion device including a diode rectification circuit with only one arm which rectifies input voltage from a single-phase AC power supply, a leg circuit including an upper leg and a lower leg each formed by two semiconductor switching elements connected in series, balance resistors connected in parallel to the respective semiconductor switching elements of the leg circuit, a charge/discharge capacitor connected between a connection point of the semiconductor switching elements in the upper leg and a connection point of the semiconductor switching elements in the lower leg, a smoothing capacitor connected to the output of the leg circuit, an inrush preventing circuit including a current limiting resistor between the single-phase AC power supply and the diode rectification circuit with only one arm, and a reactor.

Figure 5:
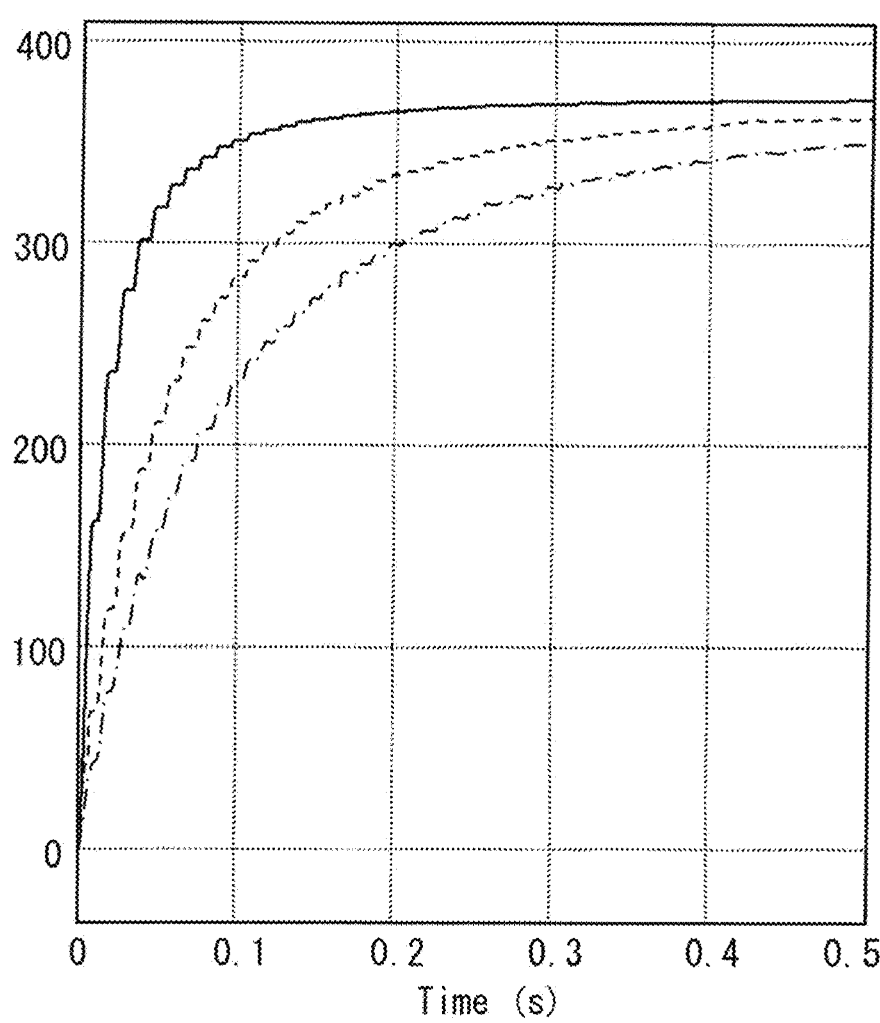
FIG. 5 shows voltage waveforms during initial charging of a smoothing capacitor with respect to change of a current limiting resistor in the power conversion device according to embodiment 1.
Figure 6:
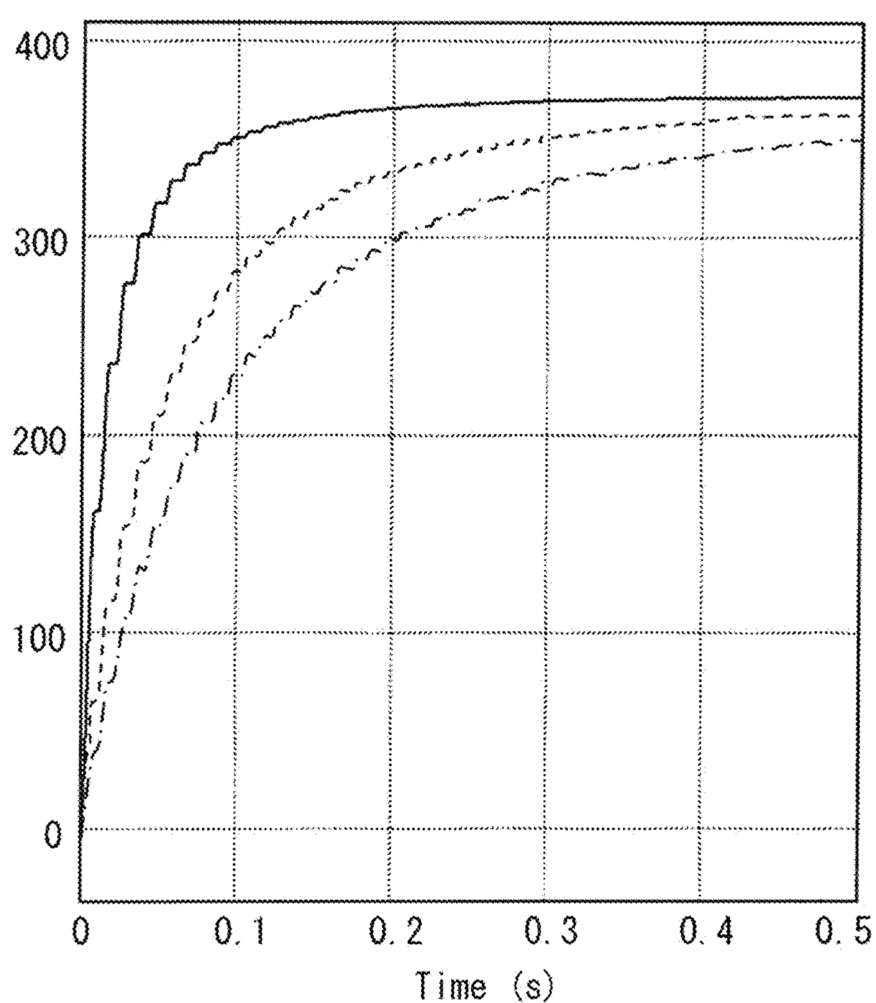
FIG. 6 shows voltage waveforms during initial charging of the smoothing capacitor with respect to change in the capacitance of the smoothing capacitor in the power conversion device according to embodiment 1.

Hereinafter, the configuration and operation of the power conversion device according to embodiment 1 will be described with reference to FIG. 1 which is a basic configuration diagram of the power conversion device, FIG. 2 which is a circuit configuration diagram of the power conversion device, FIG. 3A-3D and FIG. 4A-3D which show operation waveforms during initial charging in a comparative example, FIG. 5 which shows voltage waveforms during initial charging of the smoothing capacitor with respect to change of the current limiting resistor, FIG. 6 which shows voltage waveforms during initial charging of the smoothing capacitor with respect to change in the capacitance of the smoothing capacitor, FIG. 7 which shows voltage waveforms during the initial charging of the smoothing capacitor with respect to change of the balance resistor, FIG. 8 which shows voltage waveforms during initial charging of the smoothing capacitor with respect to change in the capacitance of the charge/discharge capacitor, FIG. 9A. 9B to FIG. 12A, 12B which show operation waveforms during initial charging with respect to change in an overvoltage degree index, and FIG. 13 which is a graph in which maximum voltage applied to the semiconductor switching element is plotted with respect to change in the overvoltage degree index.

Before describing the configuration of a power conversion device 100 of embodiment 1 with reference to FIG. 2, the basic configuration thereof which is common among the power conversion devices of embodiment 1 and the subsequent embodiments 2, and so forth, will be described with reference to FIG. 1.

A power conversion device 1000 receives an input from an AC power supply 1, includes an inrush preventing circuit 2 including a current limiting resistor, a rectification circuit 4, a leg circuit 5, a balance resistor 6, a charge/discharge capacitor 7, and a smoothing capacitor 8, and has an output to which a load 10 is connected.

Here, the rectification circuit 4 converts AC power from the AC power supply 1 to DC power. The leg circuit 5 includes an upper leg and a lower leg each formed by a series circuit of semiconductor elements.

The balance resistor 6 is connected in parallel to the semiconductor elements of the leg circuit 5. Specific connection methods will be described in the embodiments. At least one charge/discharge capacitor 7 is connected between a connection point of the semiconductor elements in the upper leg and a connection point of the semiconductor elements in the lower leg.

The smoothing capacitor 8 is connected to the output of the leg circuit 5, and the load 10 is connected to the smoothing capacitor 8.

Here, each semiconductor element includes a semiconductor switching element and a diode.

In a case where the AC power supply 1 is a three-phase AC power supply, the inrush preventing circuit 2 is located at a position after the rectification circuit 4.

Generally, in the power conversion device, a reactor is provided on the input side and a controller for driving the leg circuit is needed. However, these are not directly relevant to the object of the present disclosure "to provide a power conversion device that can suppress overvoltage during initial charging when a power supply is turned on, during operation, and in a stopped state of a power converter", and therefore are omitted in the basic configuration in FIG. 1.

The AC power supply 1 and the load 10 are not components of the power conversion device 1000, but they are closely related and therefore are described without being separated.

Next, the configuration of a power conversion device 100 shown in FIG. 2 will be described.

The power conversion device 100 receives an input from a single-phase AC power supply 1*a*, includes the inrush preventing circuit 2 including a current limiting resistor 21 and a switch 22, the reactor 3, a diode rectification circuit 4*a* with only one arm including diodes 41, 42, a leg circuit Sa including a series circuit of semiconductor switching elements 51, 52 in an upper leg and a series circuit of semiconductor switching elements 53, 54 in a lower leg, a balance resistor 6*a* including resistors 61, 62, 63, 64, the charge/discharge capacitor 7, and the smoothing capacitor 8, and has an output to which the load 10 is connected. Further, the power conversion device 100 includes a controller 9 for driving the leg circuit 5*a*.

Figure 2:
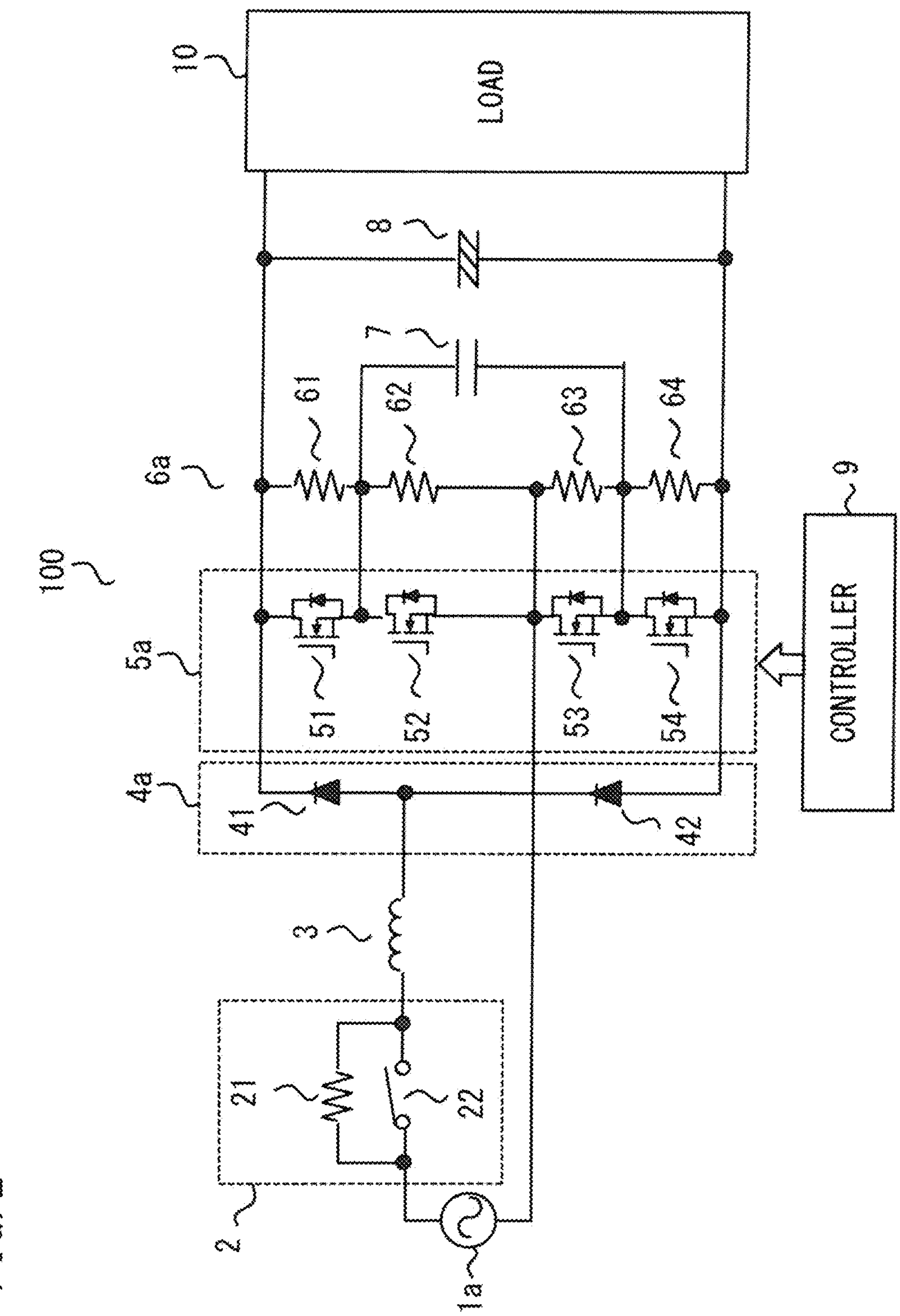
FIG. 2 is a circuit configuration diagram of the power conversion device according to embodiment 1.

The rectification circuit with only one arm (only one end of the single-phase AC) formed by two diodes 41, 42 as shown in FIG. 2 is described as the diode rectification circuit 4*a* with only one arm. For a single-phase AC described in other embodiments, the rectification circuit is described as a bridge rectification circuit 4*b* formed by four diodes, and for a three-phase AC, the rectification circuit is described as a bridge rectification circuit 4*c* formed by six diodes, for the purpose of discrimination.

When the balance resistors are collectively mentioned, they are described as the balance resistor 6*a*, and when each balance resistor is individually mentioned, the balance resistor is described as, for example, the balance resistor 61.

A connection point of the anode of the diode 41 and the cathode of the diode 42 of the diode rectification circuit 4*a* with only one arm is connected to one end of the single-phase AC power supply 1*a* via the reactor 3. A connection point of the upper leg and the lower leg of the leg circuit 5*a* is connected to another end of the single-phase AC power supply 1*a*. The cathode of the diode 41 of the diode rectification circuit 4*a* with only one arm is connected to a positive-side DC bus of the leg circuit 5*a* and the anode of the diode 42 is connected to a negative-side DC bus of the leg circuit Sa.

The balance resistors 61 to 64 are respectively connected in parallel to the semiconductor switching elements 51 to 54. The charge/discharge capacitor 7 is connected in parallel to a series circuit of the semiconductor switching elements 52, 53, that is, in parallel to a series circuit of the balance resistors 62, 63. The smoothing capacitor 8 is connected to the output of the leg circuit 5*a*, and the load is connected to the output thereof.

The current limiting resistor 21 can be replaced with a positive temperature coefficient (PTC) thermistor and a negative temperature coefficient (NTC) thermistor. The semiconductor switching elements 51 to 54 are described as metal-oxide-semiconductor field-effect transistors (MOSFET), but can be replaced with insulated-gate-bipolar-transistors (IGBT). Alternatively, semiconductor switching elements made of a new material such as SiC or GaN may be used.

In the power conversion device 100, the switch 22 is turned off during initial charging operation. When the initial charging operation described later in detail is completed, the switch 22 is turned on so that the current limiting resistor 21 is bypassed. Then, the semiconductor switching elements 51 to 54 are operated by driving signals from the controller 9.

With the semiconductor switching elements 51 to 54 subjected to appropriate switching control by driving signals from the controller 9, power supply current can be made into a sinewave state and the power supply power factor can be controlled to be almost 1. Further, the charge/discharge capacitor 7 and the smoothing capacitor 8 can be controlled at desired voltage values.

In particular, when the voltage value of the charge/discharge capacitor 7 is set to ½ of the voltage value of the smoothing capacitor 8, 3-level outputs can be obtained. In the case of 3-level outputs, the inductance value of the reactor 3 can be reduced and loss in switching of the semiconductor switching elements 51 to 54 can be reduced, as compared to a general 2-level power converter.

If the balance resistors 61, 62, 63, 64 have the same resistance value, the overvoltage suppression effect is high. Here, the average value of the resistances of the balance resistors 61, 62, 63, 64 is denoted by Rf.

Further, the resistance value of the current limiting resistor 21 is denoted by R0, the capacitance of the charge/discharge capacitor 7 is denoted by Cf, and the capacitance of the smoothing capacitor 8 is denoted by C0.

In the following description, the "average value Rf of the resistances of the balance resistors 61, 62, 63, 64" is described as a "resistance value Rf of a balance resistor", unless they particularly need to be discriminated.

The unit of a resistance is denoted by Q, the unit of a capacitance is denoted by pF, and calculation is performed using these units.

Here, operation of the power conversion device 100 shown in FIG. 2 in a normal case will be described. In the power conversion device 100 shown in FIG. 2, operation is switched in accordance with whether AC voltage outputted from the AC power supply 1 is positive or negative.

When AC voltage outputted from the AC power supply 1 is positive, the semiconductor switching elements 51, 52 of the upper leg are turned on/off. Thus, the current path is switched among a path on which current flows through the charge/discharge capacitor 7 so as to charge the charge/discharge capacitor 7, a path for discharging the charge/discharge capacitor 7, and a path on which current does not flow through the charge/discharge capacitor 7. Through the above switching, input voltage from the AC power supply 1 is boosted and the boosted voltage is outputted to the smoothing capacitor 8 side.

When AC voltage outputted from the AC power supply 1 is negative, the semiconductor switching elements 53, 54 of the lower leg are turned on/off. Thus, path switching as described above is performed, whereby input voltage from the AC power supply 1 is boosted and the boosted voltage is outputted to the smoothing capacitor 8 side.

Operation in a normal case is not limited to the above-described one.

Next, initial charging operation for the charge/discharge capacitor 7 and the smoothing capacitor 8 when the power supply is turned on will be described with reference to FIG. 3A-3D to FIG. 13.

First, initial charging operation in a comparative example will be described. Circuit constants are set as follows: the resistance value R0 of the current limiting resistor=10 kΩ, the resistance value Rf of the balance resistor=100 kΩ, the capacitance C0 of the smoothing capacitor 8=1000 μF, and the capacitance Cf of the charge/discharge capacitor 7=10 μF.

FIG. 3A-3D and FIG. 4A-4D show initial charging operation waveforms when the power supply is turned on. Operation waveforms when the power supply is turned on at time 0 are shown.

Figure 3:
FIG. 3A shows operation waveforms during initial charging in a comparative example of a power conversion device according to embodiment 1.
FIG. 3B shows operation waveforms during initial charging in a comparative example of a power conversion device according to embodiment 1.
FIG. 3C shows operation waveforms during initial charging in a comparative example of a power conversion device according to embodiment 1.
FIG. 3D shows operation waveforms during initial charging in a comparative example of a power conversion device according to embodiment 1.
Figure 3:
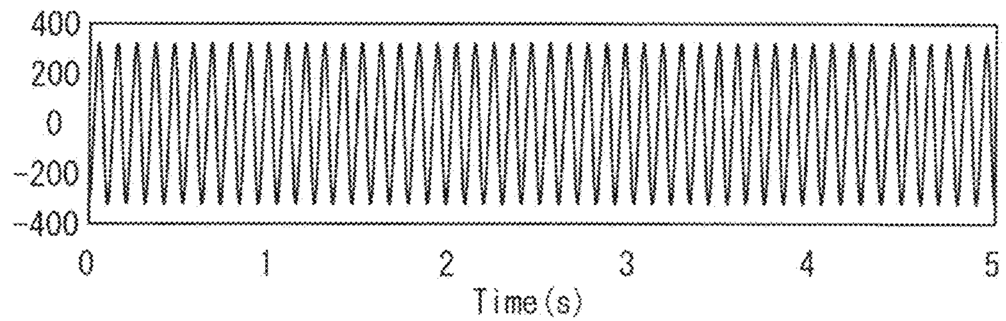
Figure 3B:
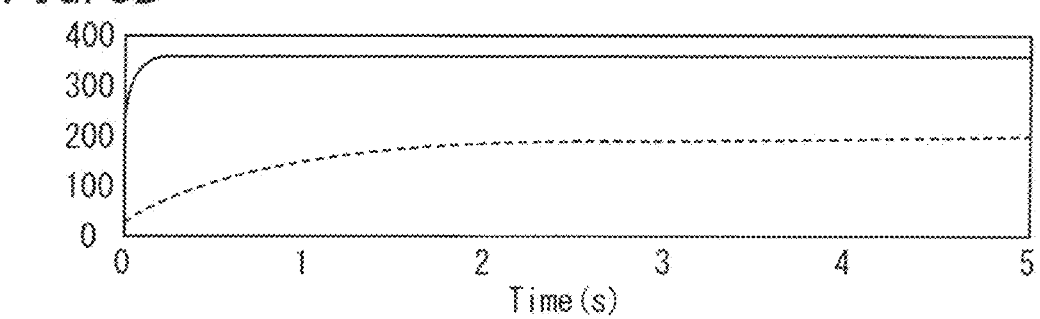
Figure 3C:
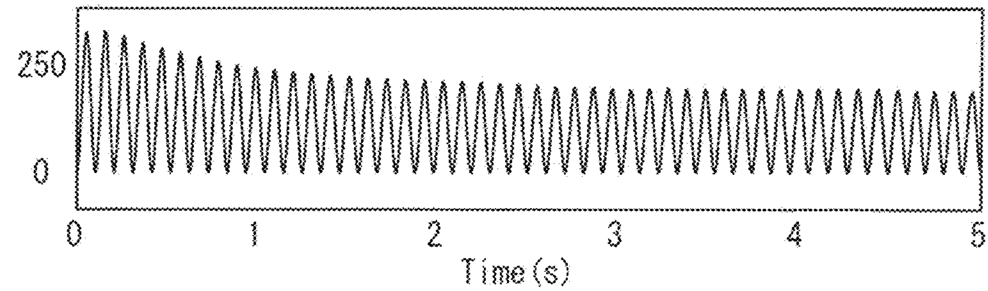
Figure 3D:
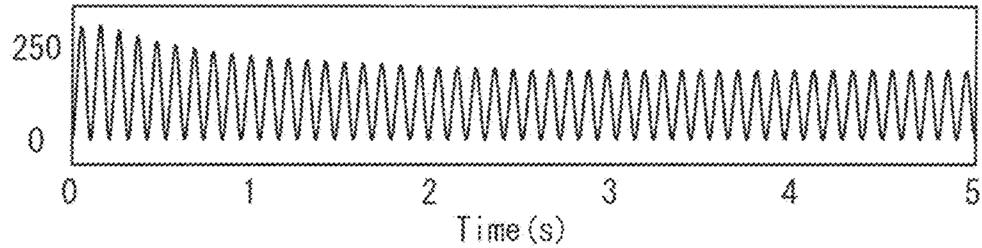

FIG. 3A-3D shows entire waveforms, in which FIG. 3A indicates power supply voltage of the AC power supply 1, FIG. 3B indicates voltage (solid line) of the smoothing capacitor 8 and voltage (dotted line) of the charge/discharge capacitor 7, FIG. 3C indicates voltage across the semiconductor switching element 51, and FIG. 3D indicates voltage across the semiconductor switching element 54.

Actual waveforms of FIG. 3A, FIG. 3C, FIG. 3D are denser and thus cannot be recognized as sine waveforms, but waveforms in FIG. 3A-3D are shown coarsely for facilitating the understanding.

FIG. 4A-4D shows enlarged waveforms and thus operation just after the power supply is turned on is illustrated in an enlarged manner. These waveforms correspond to FIG. 3A to FIG. 3D. Specifically, FIG. 4A indicates power supply voltage of the AC power supply 1, FIG. 4B indicates voltage (solid line) of the smoothing capacitor 8 and voltage (dotted line) of the charge/discharge capacitor 7, FIG. 4C indicates voltage across the semiconductor switching element 51, and FIG. 4D indicates voltage across the semiconductor switching element 54.

Voltage applied at the time of power supply turn-on operation causes overshoot and thus an overvoltage period arises. In a case where this state arises, the semiconductor switching element cannot be formed by a low-withstanding-voltage element, and this is disadvantageous in terms of efficiency improvement and cost reduction.

In order to prevent such an overvoltage phenomenon, it is necessary to make a charging time of the smoothing capacitor 8 slow or make a charging time of the charge/discharge capacitor 7 fast, so as to suppress voltage overshoot.

Here, a method for suppressing overvoltage in initial charging will be described.

The charging speed of the smoothing capacitor 8 can be represented as a factor K0 by Expression (1) which is a product of R0 and C0.

$$K0 = R0^{*}C0 \tag{1}$$

As the factor K0 increases, the charging time is prolonged, and as the factor K0 decreases, the charging time is shortened. FIG. 5 shows comparison of charging waveforms of the smoothing capacitor 8 when the resistance value R0 of the current limiting resistor is 10Ω (solid line), R0 is 30Ω (dotted line), and R0 is 50Ω (dotted-dashed line).

The circuit constants other than the resistance value R0 of the current limiting resistor are the same among the above three conditions, that is, the resistance value Rf of the balance resistor is 100 kΩ, the capacitance C0 of the smoothing capacitor 8 is 1000 μF, and the capacitance Cf of the charge/discharge capacitor 7 is 10 ρF.

When the resistance value R0 of the current limiting resistor is increased, K0 increases and thus it is found that the charging time of the smoothing capacitor 8 is prolonged.

Increasing the capacitance C0 of the smoothing capacitor 8 can also make the charging time slow. FIG. 6 shows comparison of charging waveforms of the smoothing capacitor 8 when the capacitance C0 of the smoothing capacitor 8 is 1000 μF (solid line), C0 is 3000 μF (dotted line), and C0 is 5000 μF (dotted-dashed line).

The circuit constants other than the capacitance C0 of the smoothing capacitor 8 are the same among the above three conditions, that is, the resistance value R0 of the current limiting resistor is 10Ω, the resistance value Rf of the balance resistor is 100 kΩ, and the capacitance Cf of the charge/discharge capacitor 7 is 10 μF. Also when the capacitance C0 of the smoothing capacitor 8 is increased, the factor K0 increases and thus it is found that the charging time of the smoothing capacitor 8 is prolonged.

When the factor K0 is the same value, the charging time is the same even if the resistance value R0 of the current limiting resistor and the capacitance C0 of the smoothing capacitor 8 are changed.

The charging speed of the charge/discharge capacitor 7 can be represented as a factor Kf by Expression (2) which is a product of the resistance value Rf of the balance resistor and the capacitance Cf of the charge/discharge capacitor 7.

$$Kf = Rf^{*}Cf \tag{2}$$

As the factor Kf increases, the charging time is prolonged, and as the factor Kf decreases, the charging time is shortened.

Figure 7:
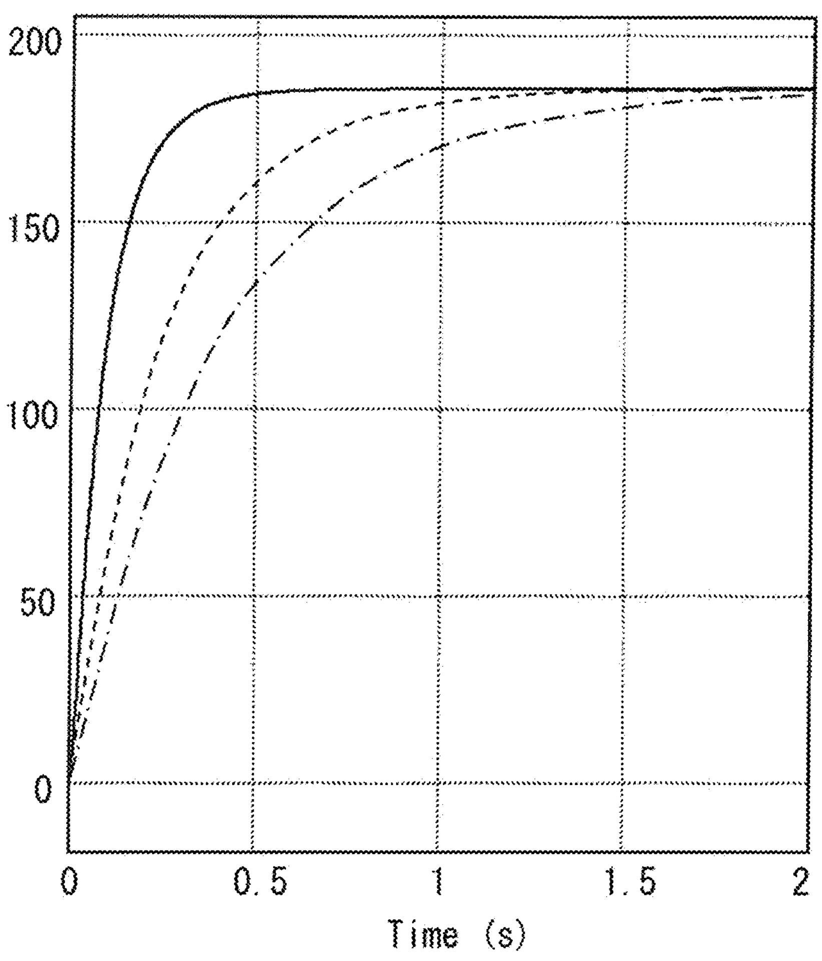
FIG. 7 shows voltage waveforms during initial charging of the smoothing capacitor with respect to change of a balance resistor in the power conversion device according to embodiment 1.
Figure 8:
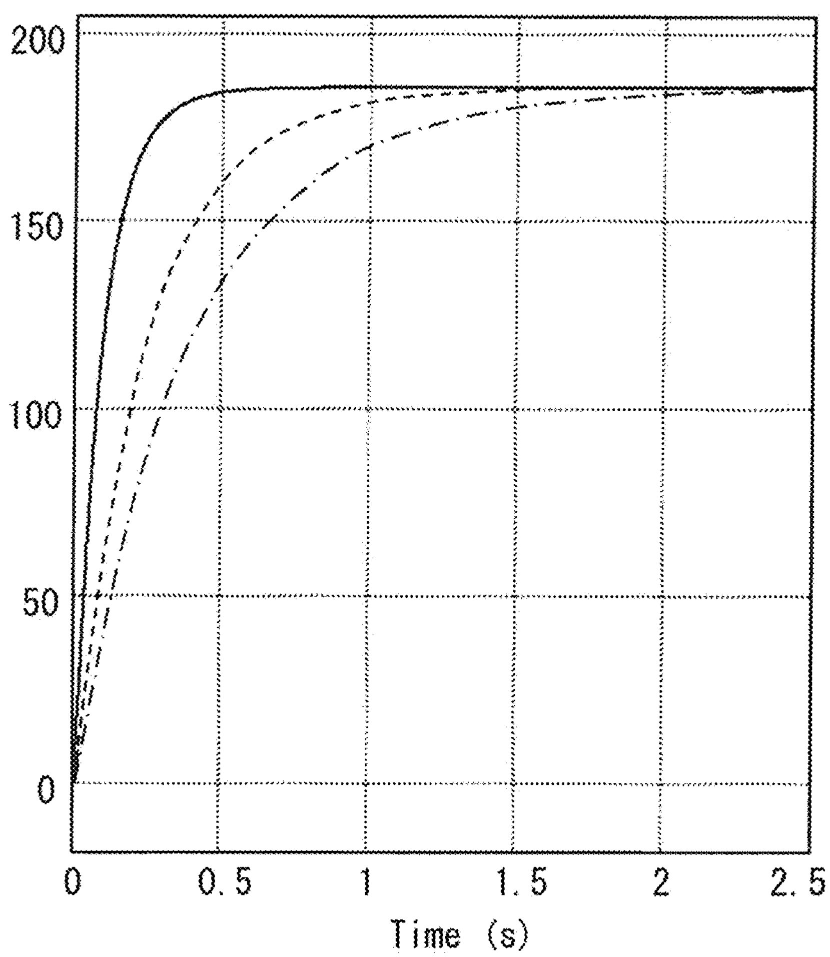
FIG. 8 shows voltage waveforms during initial charging of the smoothing capacitor with respect to change in the capacitance of a charge/discharge capacitor in the power conversion device according to embodiment 1.

FIG. 7 shows comparison of charging waveforms of the charge/discharge capacitor 7 when the resistance value Rf of the balance resistor is 10 kΩ (solid line), Rf is 30 kΩ (dotted line), and Rf is 50 kΩ (dotted-dashed line).

The circuit constants other than the resistance value of the balance resistor are the same among the above three conditions, that is, the resistance value R0 of the current limiting resistor is 10Ω, the capacitance C0 of the smoothing capacitor 8 is 1000 μF, and the capacitance Cf of the charge/discharge capacitor 7 is 10 ρF.

When the resistance value Rf of the balance resistor is increased, the factor Kf increases and thus it is found that the charging time is prolonged.

It should be noted that, if the resistance value Rf of the balance resistor is excessively decreased, loss in the balance resistor increases, though the charging time is shortened.

Increasing the capacitance Cf of the charge/discharge capacitor 7 can also make the charging time slow. FIG. 8 shows comparison of charging waveforms of the charge/discharge capacitor 7 when the capacitance Cf of the charge/discharge capacitor 7 is 10 ρF, Cf is 30 ρF, and Cf is 50 ρF.

The circuit constants other than the capacitance of the charge/discharge capacitor 7 are the same among the above three conditions, that is, the resistance value R0 of the current limiting resistor is 10Ω, the resistance value Rf of the balance resistor is 10 kΩ, and the capacitance C0 of the smoothing capacitor 8 is 1000 μF.

Also when the capacitance Cf of the charge/discharge capacitor 7 is increased, the factor Kf increases and thus it is found that the charging time is prolonged.

When the factor Kf is the same value, the charging time is the same even if the resistance value Rf of the balance resistor and the capacitance Cf of the charge/discharge capacitor 7 are changed.

The charging speed of the smoothing capacitor 8 can be controlled by increasing/decreasing the factor K0, and the charging speed of the charge/discharge capacitor 7 can be controlled by increasing/decreasing the factor Kf.

As described above, in the circuit configuration of the power conversion device 100 of embodiment 1, decreasing the factor Kf and increasing the factor K0 is effective for suppressing overvoltage applied to the semiconductor switching elements 51 to 54 in initial charging.

Here, the overvoltage degree index can be represented as a factor Km by Expression (3).

$$Km = Kf/K0 \tag{3}$$

The balance between the charging times of the smoothing capacitor 8 and the charge/discharge capacitor 7 can be expressed by the factor Km which is the overvoltage degree index. As the factor Km decreases, overshoot in initial charging of the charge/discharge capacitor 7 can be more suppressed.

FIG. 9A, 9B to FIG. 12A, 12B show charging characteristics of the smoothing capacitor 8 and the charge/discharge capacitor 7 when the factor Km is 100 (comparative example), Km is 20, Km is 7.5, and Km is 3.

Figures 10, 10A, 10B:
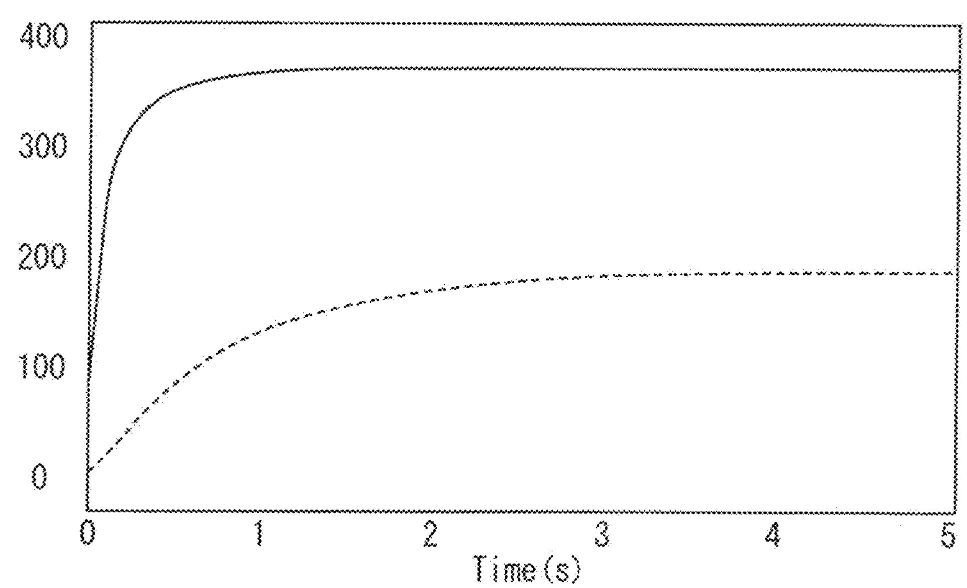
FIG. 10A shows operation waveforms during initial charging with respect to change in the overvoltage degree index in the power conversion device according to embodiment 1.
FIG. 10B shows operation waveforms during initial charging with respect to change in the overvoltage degree index in the power conversion device according to embodiment 1.

FIG. 9A, 9B corresponds to the case of the factor Km=100, FIG. 10A, 10B corresponds to the case of the factor Km=20, FIG. 11A, 11B corresponds to the case of the factor Km=7.5, and FIG. 12A, 12B corresponds to the case of the factor Km=3.

In FIG. 9A, 9B to FIG. 12A, 12B, a solid line in FIG. 9A (FIG. 10A, FIG. 11A, FIG. 12A) indicates voltage of the smoothing capacitor 8 and a dotted line indicates voltage of the charge/discharge capacitor 7. In FIG. 9A, 9B to FIG. 12A, 12B, FIG. 9B, FIG. 10B, FIG. 11B, FIG. 12B) indicates difference voltage between voltage of the smoothing capacitor 8 and voltage of the charge/discharge capacitor 7. The difference voltage is applied to the semiconductor switching elements 51, 54.

The voltage exceeds 300 V in the case of the factor Km=100 in the comparative example, but it is found that, when the factor Km is decreased, the overshoot voltage is suppressed.

Since the peak value of AC voltage of the single-phase AC power supply 1*a* in embodiment 1 is 374 V, a converged value of voltage of the smoothing capacitor 8 is 374 V and a converged value of voltage of the charge/discharge capacitor 7 is 187 V.

In the condition of the factor Km=20, the peak value of the semiconductor switching element applied voltage is 280 V and overshoot of the semiconductor switching element applied voltage decreases to 280/187=1.5 times. It can be confirmed that the peak value of the semiconductor switching element applied voltage is suppressed and thus the effect of the power conversion device 100 of embodiment 1 is exhibited.

Further, when the factor Km is decreased to 7.5, the peak value of the semiconductor switching element applied voltage becomes 234 V and the overshoot decreases to 234/187=1.25 times. Thus, it can be confirmed that the effect of the power conversion device 100 of embodiment 1 is further exhibited.

Further, when the factor Km is decreased to 3, overshoot of the semiconductor switching element applied voltage almost disappears. Thus, the effect of the power conversion device 100 of embodiment 1 can be maximally exhibited.

In the above analysis, the resistance value R0 of the current limiting resistor is increased in order to decrease the factor Km, whereby the charging speed of the smoothing capacitor 8 is made slow and thus overshoot of the semiconductor switching element applied voltage is suppressed.

However, it is also possible to suppress overshoot of the semiconductor switching element applied voltage by decreasing the resistance value Rf of the balance resistor and making the charging speed of the charge/discharge capacitor 7 fast.

In addition, it is also possible to adjust the charging time by adjusting the capacitance C0 of the smoothing capacitor 8 and the capacitance Cf of the charge/discharge capacitor 7. However, the capacitances of the capacitors influence operation of the converter and the capacitors are more expensive components than the resistors. Therefore, the degree of freedom in selecting the capacitors is small as compared to the resistors.

Figure 13:
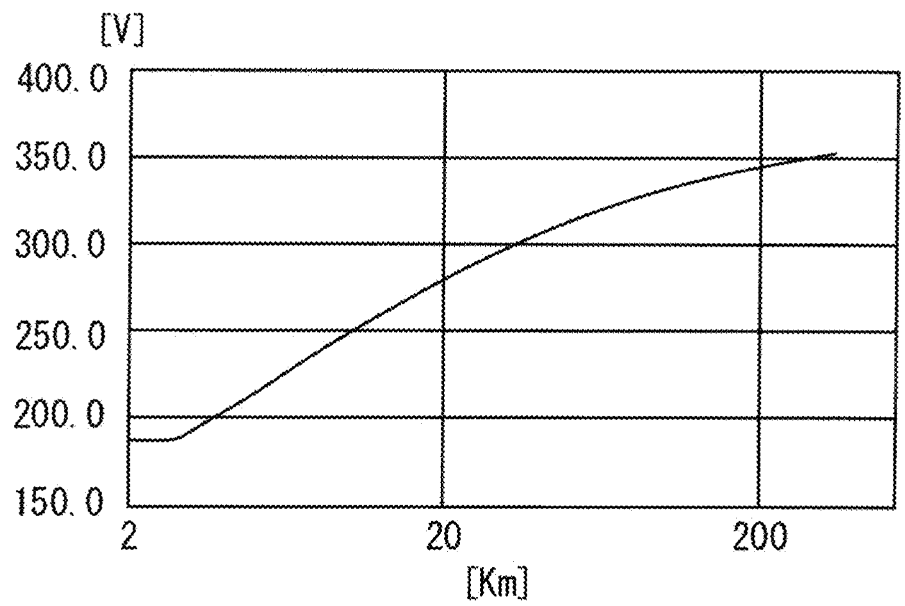
FIG. 13 is a graph in which maximum voltage applied to a semiconductor switching element is plotted with respect to change in the overvoltage degree index in the power conversion device according to embodiment 1.

When the factor Km and the peak value of the semiconductor switching element applied voltage are represented as a graph, a relationship shown in FIG. 13 is obtained.

In FIG. 13, the horizontal axis indicates the factor Km and the vertical axis indicates maximum voltage (V) across the semiconductor switching element.

It is clear that, as the factor Km decreases, the peak voltage can be more suppressed.

When the balance resistors 61, 62, 63, 64 have the same resistance value, the effect of the power conversion device 100 of embodiment 1 increases. However, even if the resistance values of the balance resistors vary by about 10% to 20%, the effect is sufficiently obtained.

In the power conversion device of embodiment 1, overvoltage of the semiconductor switching elements 51, 54 in initial charging is suppressed.

In the power conversion device 100 of embodiment 1, since overvoltage can be suppressed in initial charging, the semiconductor switching elements can be formed by lower-withstanding-voltage elements. Thus, cost increase is suppressed, high-efficiency semiconductor switching elements can be selected, and a higher-efficiency power converter can be obtained.

As described above, the power conversion device of embodiment 1 includes the diode rectification circuit with only one arm which rectifies input voltage from the single-phase AC power supply, the leg circuit including the upper leg and the lower leg each formed by two semiconductor switching elements connected in series, the balance resistors connected in parallel to the respective semiconductor switching elements of the leg circuit, the charge/discharge capacitor connected between the connection point of the semiconductor switching elements in the upper leg and the connection point of the semiconductor switching elements in the lower leg, the smoothing capacitor connected to the output of the leg circuit, the inrush preventing circuit including the current limiting resistor between the single-phase AC power supply and the diode rectification circuit with only one arm, and the reactor.

Thus, the power conversion device of embodiment 1 can suppress overvoltage during initial charging when the power supply is turned on, during operation, and in a stopped state.

Embodiment 2

A power conversion device of embodiment 2 includes a bridge rectification circuit instead of the diode rectification circuit with only one arm.

The configuration and operation of the power conversion device according to embodiment 2 will be described focusing on difference from embodiment 1, with reference to FIG. 14 which is a configuration diagram of the power conversion device and FIG. 15 and FIG. 16 which are circuit configuration diagrams in other configurations.

Figure 14:
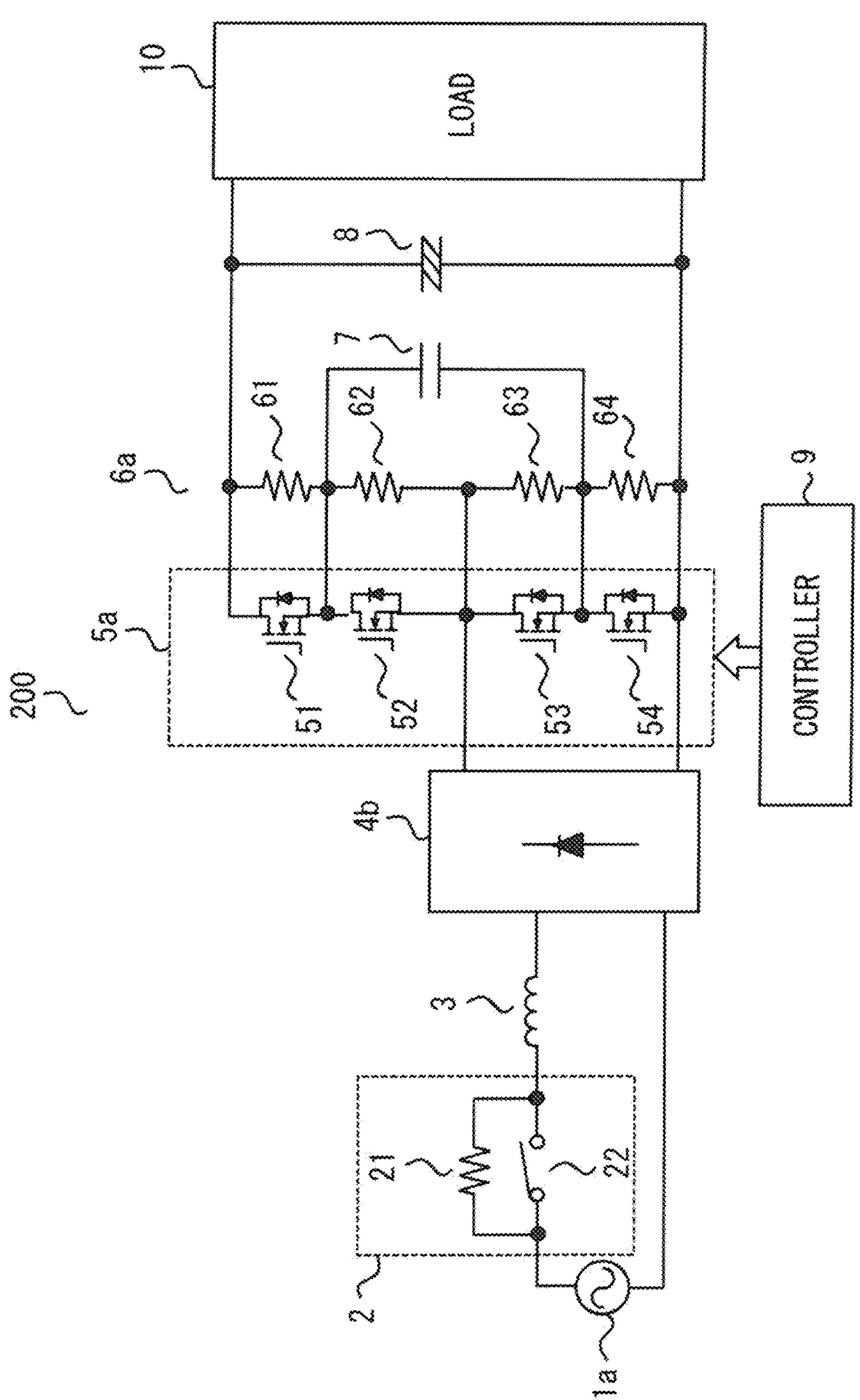
FIG. 14 is a circuit configuration diagram of a power conversion device according to embodiment 2.
Figure 15:
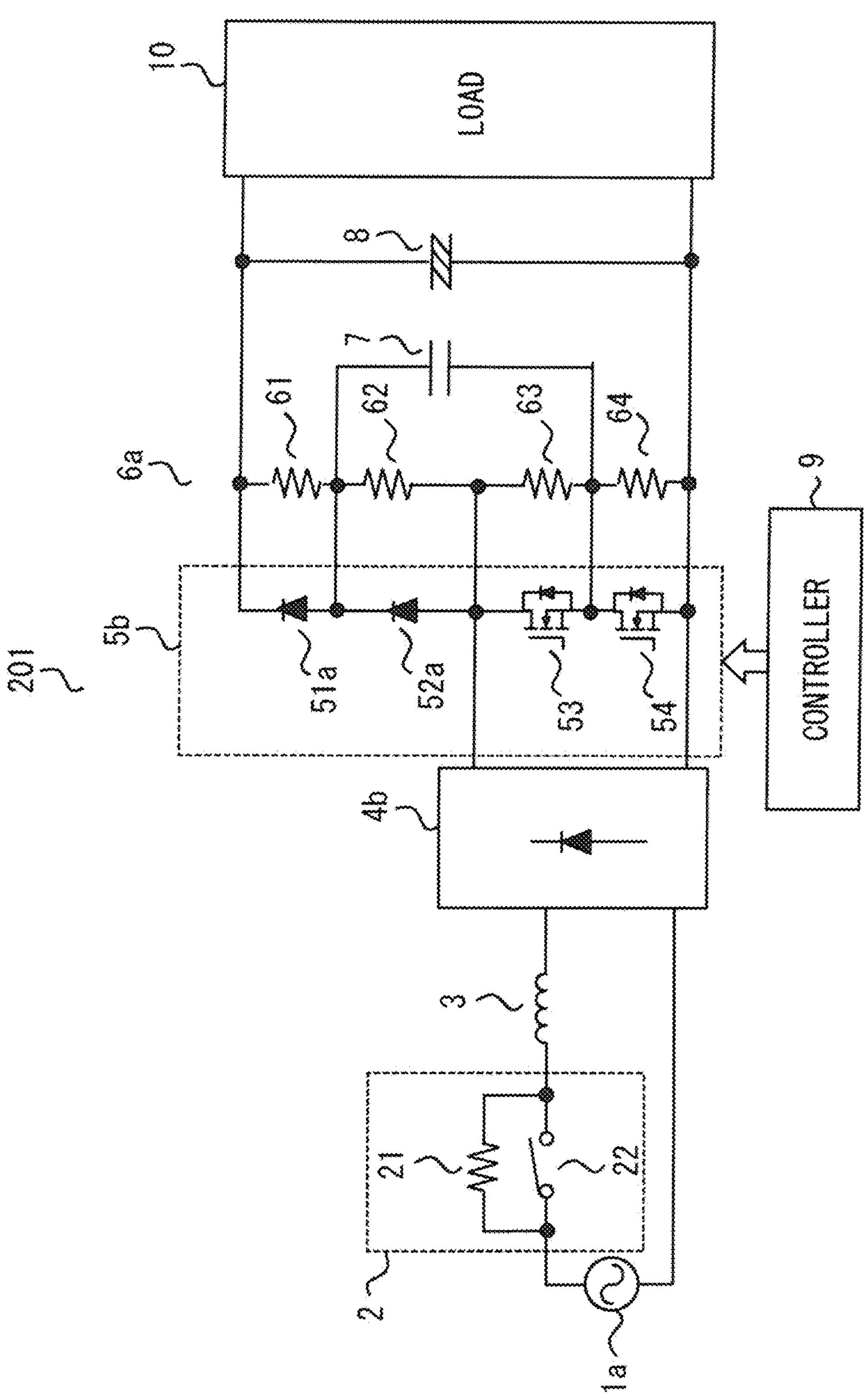
FIG. 15 is a circuit configuration diagram in another configuration 1 of the power conversion device according to embodiment 2.
Figure 16:
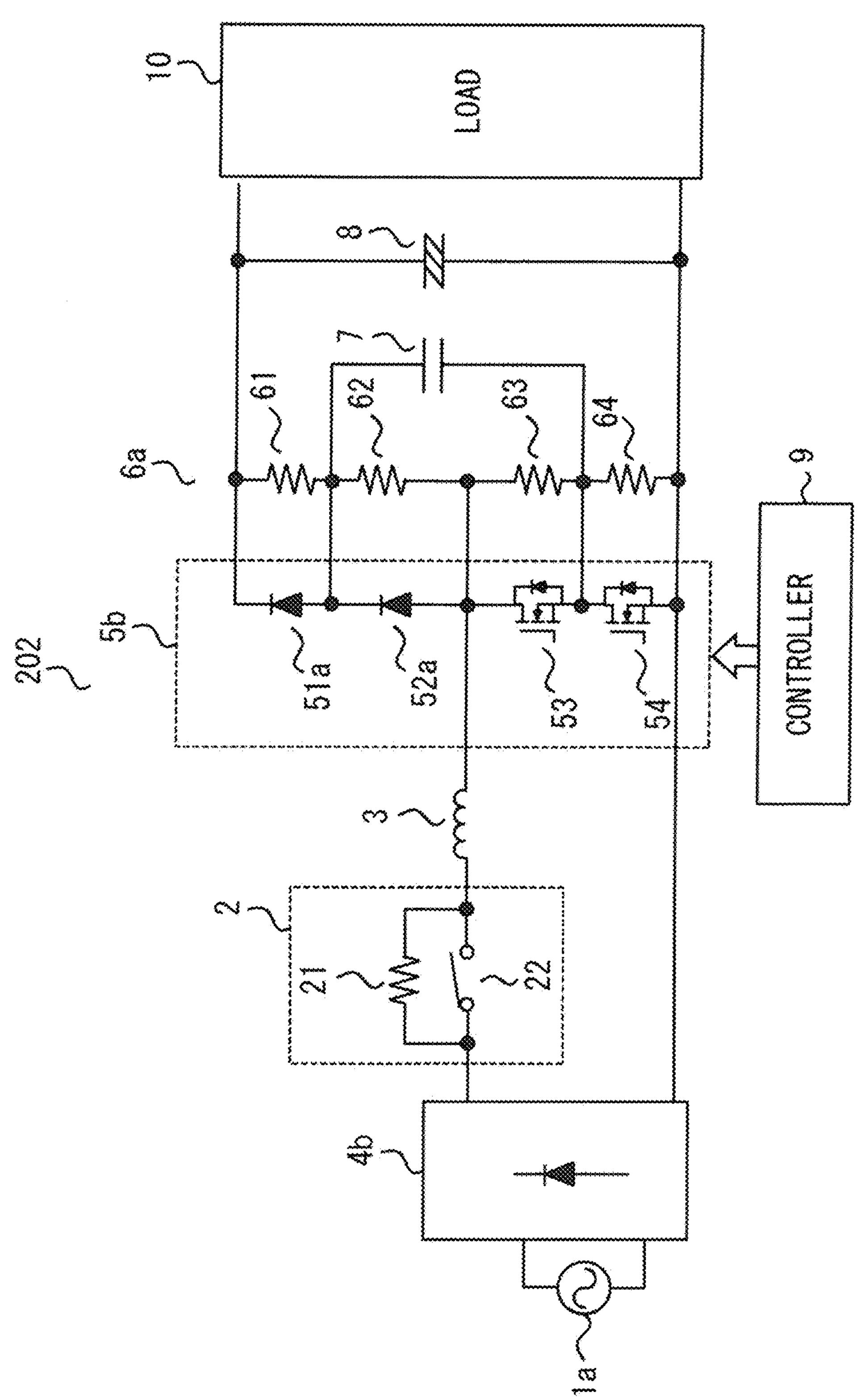
FIG. 16 is a circuit configuration diagram in another configuration 2 of the power conversion device according to embodiment 2.

In FIG. 14 to FIG. 16 in embodiment 2, the same or corresponding parts as those in embodiment 1 are denoted by the same reference characters.

For discrimination from embodiment 1, the power conversion device is denoted by 200, 201, and 202.

The difference between embodiment 2 and embodiment 1 is that the diode rectification circuit 4*a* with only one arm including two diodes is replaced with a bridge rectification circuit 4*b* including four diodes. Power is converted from AC to DC using the bridge rectification circuit 4*b*. Therefore, connection among the single-phase AC power supply 1*a*, the bridge rectification circuit 4*b*, and the leg circuit Sa is changed.

The power conversion device 200 receives an input from the single-phase AC power supply 1*a*, includes the inrush preventing circuit 2 including the current limiting resistor 21 and the switch 22, the reactor 3, the bridge rectification circuit 4*b*, the leg circuit 5*a* including a series circuit of the semiconductor switching elements 51, 52 in the upper leg and a series circuit of the semiconductor switching elements 53, 54 in the lower leg, the balance resistor da including the resistors 61, 62, 63, 64, the charge/discharge capacitor 7, and the smoothing capacitor 8, and has an output to which the load 10 is connected. Further, the power conversion device 200 includes the controller 9 for driving the leg circuit Sa.

The single-phase AC power supply 1*a* is connected to the input of the bridge rectification circuit 4*b* via the reactor 3. The output of the bridge rectification circuit 4*b* is connected in parallel to the lower leg formed by the series circuit of the semiconductor switching elements 53, 54 in the leg circuit Sa.

Connection between the leg circuit 5*a*, and the balance resistors 61 to 64, the charge/discharge capacitor 7, and the smoothing capacitor 8, is the same as in embodiment 1, and therefore description thereof is omitted.

Also in the configuration in FIG. 14 in embodiment 2, the charging characteristics of the smoothing capacitor 8 and the charge/discharge capacitor 7 are the same as those in embodiment 1, and therefore the function and the operation described in embodiment 1 can be applied.

In addition, the circuit configurations shown in FIG. 15 and FIG. 16, which are modifications of the circuit configuration in FIG. 14, also have the same function and operation as those of the power conversion device 200 in embodiment 2.

As shown in FIG. 15, the power conversion device 201 has a configuration in which the semiconductor switching elements 51, 52 are replaced with diodes 51*a*, 52*a*.

In embodiment 2, since the bridge rectification circuit 4*b* is used, the same operation as in the power conversion device 200 in FIG. 14 can be performed even if the semiconductor switching elements 51, 52 are replaced with elements other than semiconductor switching elements.

Using the diodes 51*a*, 52*a* has an advantage that the cost is lower than in a case of using the semiconductor switching elements 51, 52.

In the power conversion device 202, as shown in FIG. 16, the inrush preventing circuit 2 and the reactor 3 are transferred to the output side of the bridge rectification circuit 4*b*. Also in this circuit configuration, the function and the operation are the same as those of the power conversion devices 200, 201.

In the power conversion device 200 of embodiment 2, overvoltage of the semiconductor switching element 51 (diode 51*a*) and the semiconductor switching element 54 in initial charging can be suppressed.

In the power conversion device 200 of embodiment 2, since overvoltage can be suppressed in initial charging, the semiconductor switching elements can be formed by lower-withstand-voltage elements. Thus, cost increase is suppressed, high-efficiency elements can be selected, and a higher-efficiency power converter can be obtained.

As described above, the power conversion device of embodiment 2 includes the bridge rectification circuit instead of the diode rectification circuit with only one arm.

Thus, the power conversion device of embodiment 2 can suppress overvoltage during initial charging when the power supply is turned on, during operation, and in a stopped state.

Embodiment 3

A power conversion device of embodiment 3 uses, as the AC power supply, a three-phase AC power supply.

The configuration and operation of the power conversion device according to embodiment 3 will be described focusing on difference from embodiments 1 and 2, with reference to FIG. 17 which is a circuit configuration diagram of the power conversion device, FIG. 18 which is a circuit configuration diagram in another configuration, FIG. 19A. 19B to FIG. 22A. 22B which show operation waveforms during initial charging with respect to change in the overvoltage degree index, and FIG. 23 which is a graph in which maximum voltage applied to the semiconductor switching element is plotted with respect to change in the overvoltage degree index.

Figure 17:
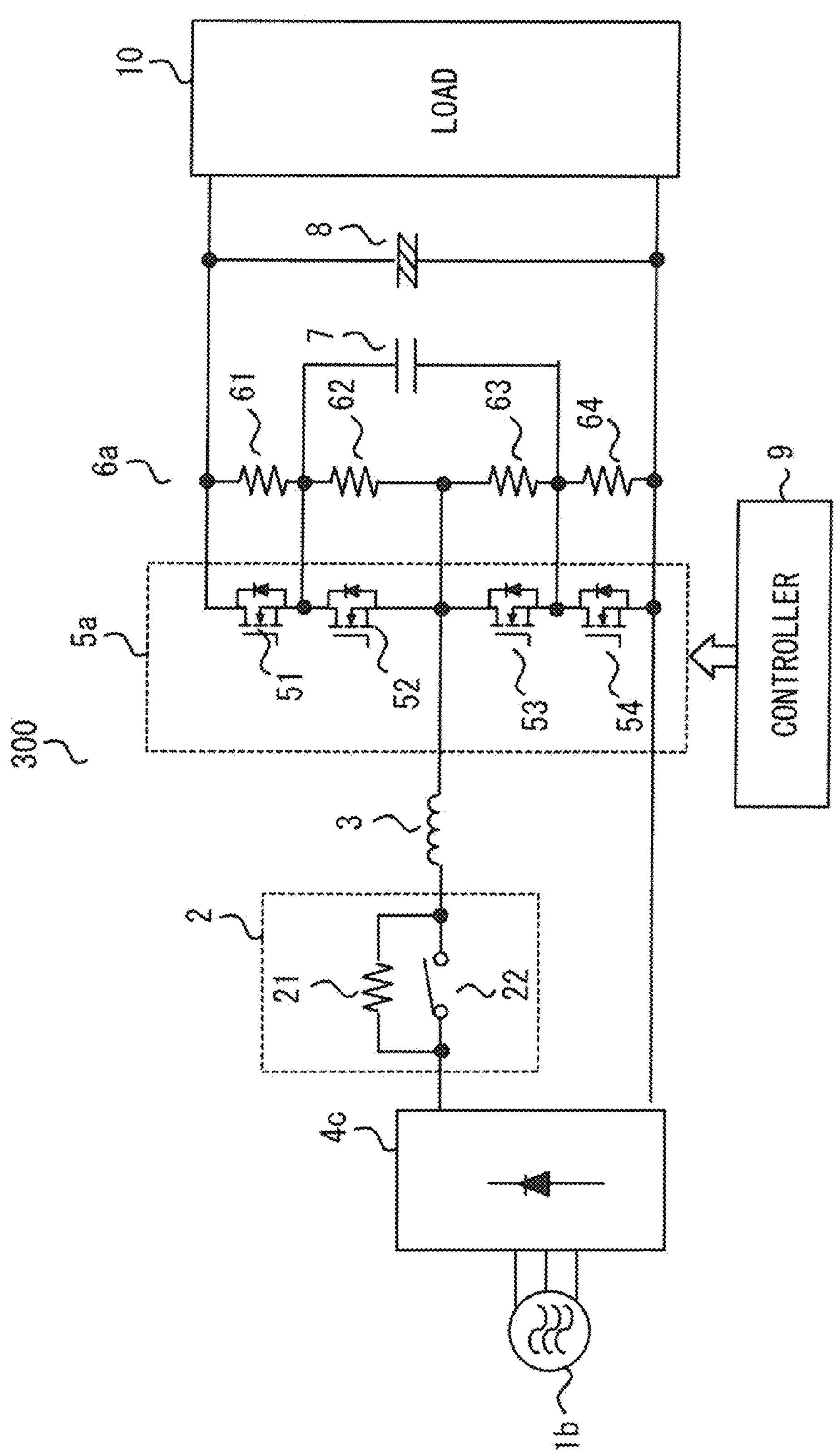
FIG. 17 is a circuit configuration diagram of a power conversion device according to embodiment 3.
Figure 18:
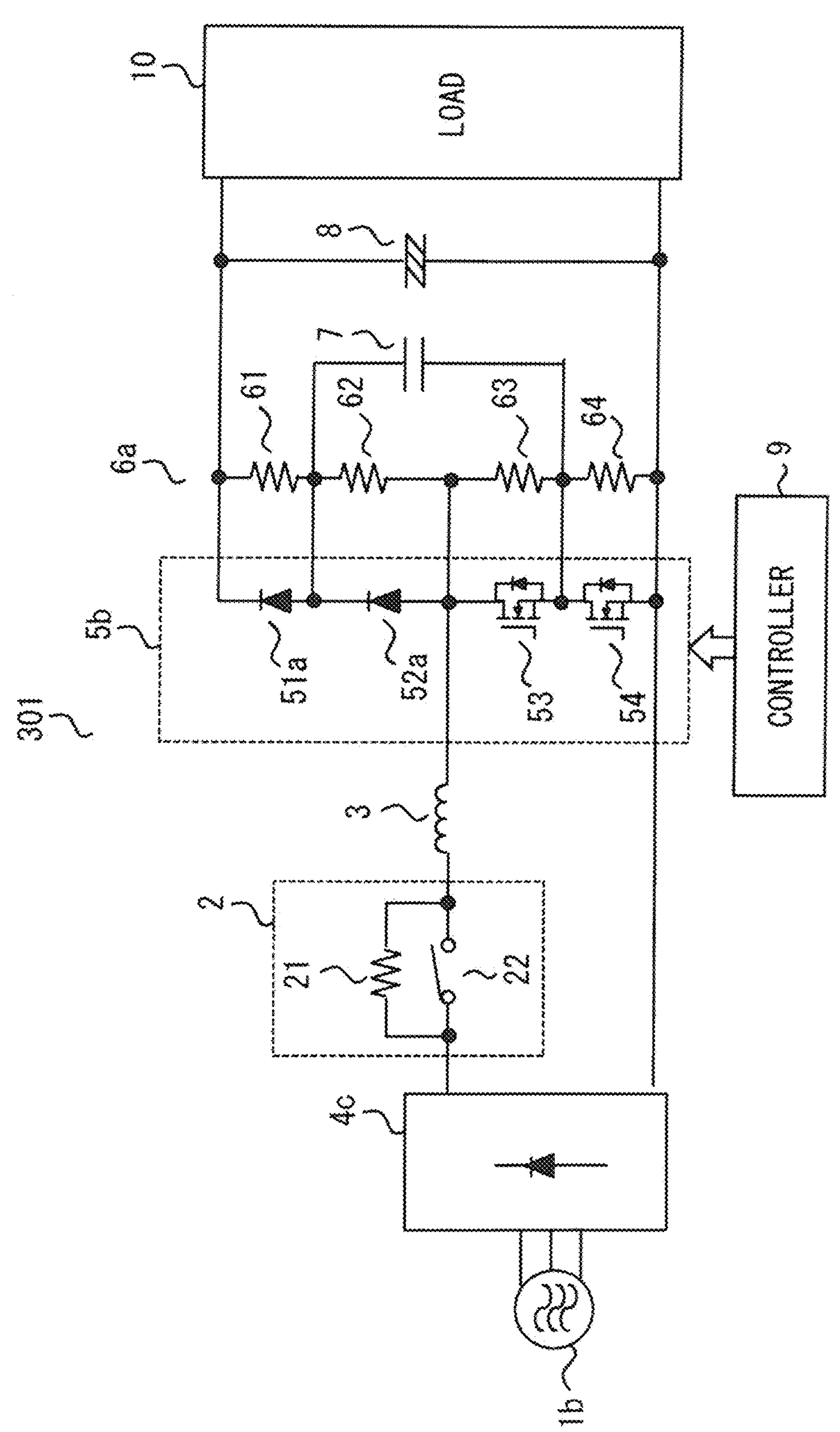
FIG. 18 is a circuit configuration diagram in another configuration of the power conversion device according to embodiment 3.

In FIG. 17 and FIG. 18 in embodiment 3, the same or corresponding parts as those in embodiments 1 and 2 are denoted by the same reference characters.

For discrimination from embodiments 1 and 2, the power conversion device is denoted by 300 and 301.

The difference between embodiment 3 and embodiment 2 is that the single-phase AC power supply is replaced with the three-phase AC power supply. Power is converted from three-phase AC to DC using a bridge rectification circuit 4*c* including six diodes. Thus, connection among the three-phase AC power supply 1*b*, the inrush preventing circuit 2, the reactor 3, the bridge rectification circuit 4*c*, and the leg circuit 5*a* is changed.

The power conversion device 300 receives an input from the three-phase AC power supply 1*b*, includes the bridge rectification circuit 4*c*, the inrush preventing circuit 2 including the current limiting resistor 21 and the switch 22, the reactor 3, the leg circuit Sa including a series circuit of the semiconductor switching elements 51, 52 in the upper leg and a series circuit of the semiconductor switching elements 53, 54 in the lower leg, the balance resistor 6*a* including the resistors 61, 62, 63, 64, the charge/discharge capacitor 7, and the smoothing capacitor 8, and has an output to which the load 10 is connected. Further, the power conversion device 300 includes the controller 9 for driving the leg circuit 5*a*.

The three-phase AC power of the three-phase AC power supply 1*b* is converted to DC power by the bridge rectification circuit 4*c* which is connected, via the inrush preventing circuit 2 and the reactor 3, in parallel to the lower leg formed by the series circuit of the semiconductor switching elements 53, 54 in the leg circuit 5*a*.

Connection between the leg circuit 5*a*, and the balance resistors 61 to 64, the charge/discharge capacitor 7, and the smoothing capacitor 8, is the same as in embodiments 1 and 2, and therefore description thereof is omitted.

FIG. 18 shows a circuit configuration of the power conversion device 301 which is another configuration of the power conversion device 300. Since power is converted from AC to DC using the bridge rectification circuit 4*c* as described in embodiment 2, the semiconductor switching elements 51, 51 of the upper leg of the leg circuit 5*a* can be replaced with the diodes 51*a*, 52*a*. Even in the case of using a leg circuit 5*b*, the function and the operation of the power conversion device 301 are the same as those of the power conversion device 300.

In embodiment 3, since the power supply is changed from the single-phase AC power supply to the three-phase AC power supply, the charging speeds of the smoothing capacitor 8 and the charge/discharge capacitor 7 are changed.

In the case of the three-phase AC power supply, DC voltage at the output of the bridge rectification circuit 4*c* has a greater average value than in the case of the single-phase AC power supply. Therefore, the charging time of the smoothing capacitor 8 becomes fast. Thus, an effective value of the factor Km is different from those in embodiments 1 and 2.

FIG. 19A, 19B to FIG. 22A, 22B show charging characteristics of the smoothing capacitor 8 and the charge/discharge capacitor 7 when the factor Km is 100 (comparative example), Km is 10, Km is 3.7, and Km is 1.5.

Figures 19, 19A, 19B:
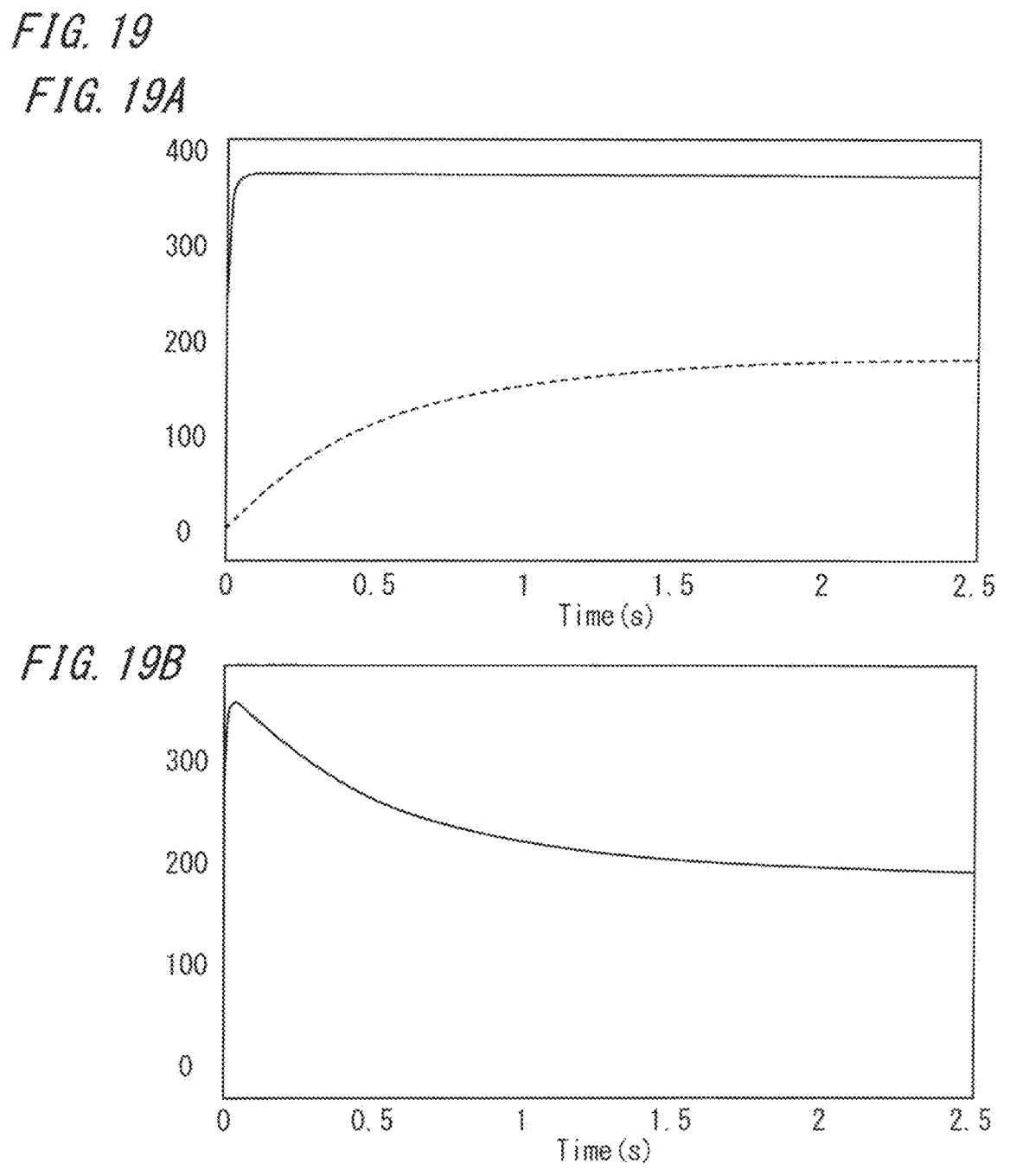

FIG. 19A, 19B corresponds to the case of the factor Km=100, FIG. 20A, 20B corresponds to the case of the factor Km=10, FIG. 21A, 21B corresponds to the case of the factor Km=3.7, and FIG. 22A, 22B corresponds to the case of the factor Km=1.5.

FIG. 19A. 19B to FIG. 22A, 21B, a solid line in FIG. 19A FIG. 20A, FIG. 21A, FIG. 22A) indicates voltage of the smoothing capacitor 8 and a dotted line indicates voltage of the charge/discharge capacitor 7.

In FIG. 19A, 19B to FIG. 22A, 21B, FIG. 19B FIG. 20B, FIG. 21B, FIG. 22B) indicates difference voltage between voltage of the smoothing capacitor 8 and voltage of the charge/discharge capacitor 7. The difference voltage is applied to the semiconductor switching element 51 (diode 51*a*) and the semiconductor switching element 54.

The voltage exceeds 300 V in the case of the factor Km=100 in the comparative example, but it is found that, when the factor Km is decreased, the overshoot voltage is suppressed.

Since the peak value of AC voltage of the three-phase AC power supply in embodiment 3 is 374 V, a converged value of voltage of the smoothing capacitor 8 is 374 V and a converged value of voltage of the charge/discharge capacitor 7 is 187 V.

In the condition of the factor Km=10, the peak value of voltage of the charge/discharge capacitor 7 is 280 V and overshoot of the semiconductor switching element applied voltage decreases to 280/187=1.5 times. It can be confirmed that the peak value of the semiconductor switching element applied voltage is suppressed and thus the effect of the power conversion device 300 of embodiment 3 is exhibited.

Further, when the factor Km is decreased to 3.7, the peak value of the semiconductor switching element applied voltage becomes 234 V and the overshoot of voltage decreases to 234/187=1.25 times. Thus, it can be confirmed that the effect of the power conversion device 300 of embodiment 3 is further exhibited.

Further, when the factor Km is decreased to 1.5, overshoot of the semiconductor switching element applied voltage almost disappears. Thus, the effect of the power conversion device 300 of embodiment 3 can be maximally exhibited.

Figure 23:
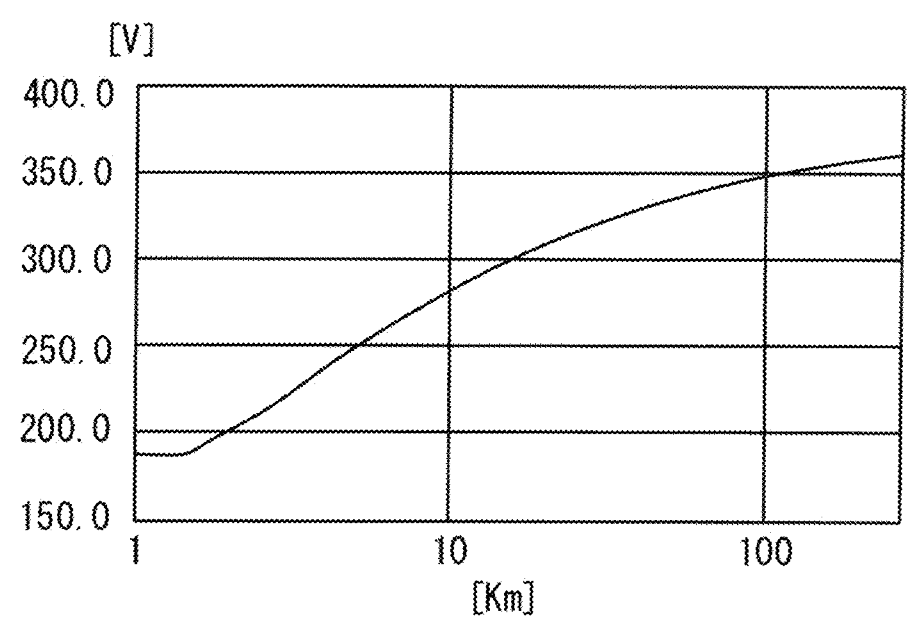
FIG. 23 is a graph in which maximum voltage applied to the semiconductor switching element is plotted with respect to change in the overvoltage degree index in the power conversion device according to embodiment 3.

When the factor Km and the peak value of the semiconductor switching element applied voltage are represented as a graph, a relationship shown in FIG. 23 is obtained.

In FIG. 23, the horizontal axis indicates the factor Km and the vertical axis indicates maximum voltage [V] across the semiconductor switching element.

It is clear that, as the factor Km decreases, the peak voltage can be more suppressed. It is found that, when the factor Km is set to be ½ as compared to embodiment 1, the same effect as in embodiment 1 can be obtained.

In the power conversion device of embodiment 3, overvoltage of the semiconductor switching element 51 (diode Sla) and the semiconductor switching element 54 in initial charging is suppressed.

In the power conversion device 300 of embodiment 3, since overvoltage can be suppressed in initial charging, the semiconductor switching elements can be formed by lower-withstanding-voltage elements. Thus, cost increase is suppressed, high-efficiency elements can be selected, and a higher-efficiency power converter can be obtained.

As described above, the power conversion device of embodiment 3 uses, as the AC power supply, the three-phase AC power supply.

Thus, the power conversion device of embodiment 3 can suppress overvoltage during initial charging when the power supply is turned on, during operation, and in a stopped state.

Embodiment 4

In a power conversion device of embodiment 4, the balance resistor is changed to a three-resistor configuration.

The configuration and operation of the power conversion device according to embodiment 4 will be described focusing on difference from embodiment 1, with reference to FIG. 24 which is a circuit configuration diagram of the power conversion device and FIG. 25 which shows comparison of the initial charging characteristic of the charge/discharge capacitor between the three-resistor configuration and the four-resistor configuration of the power conversion device.

Figure 24:
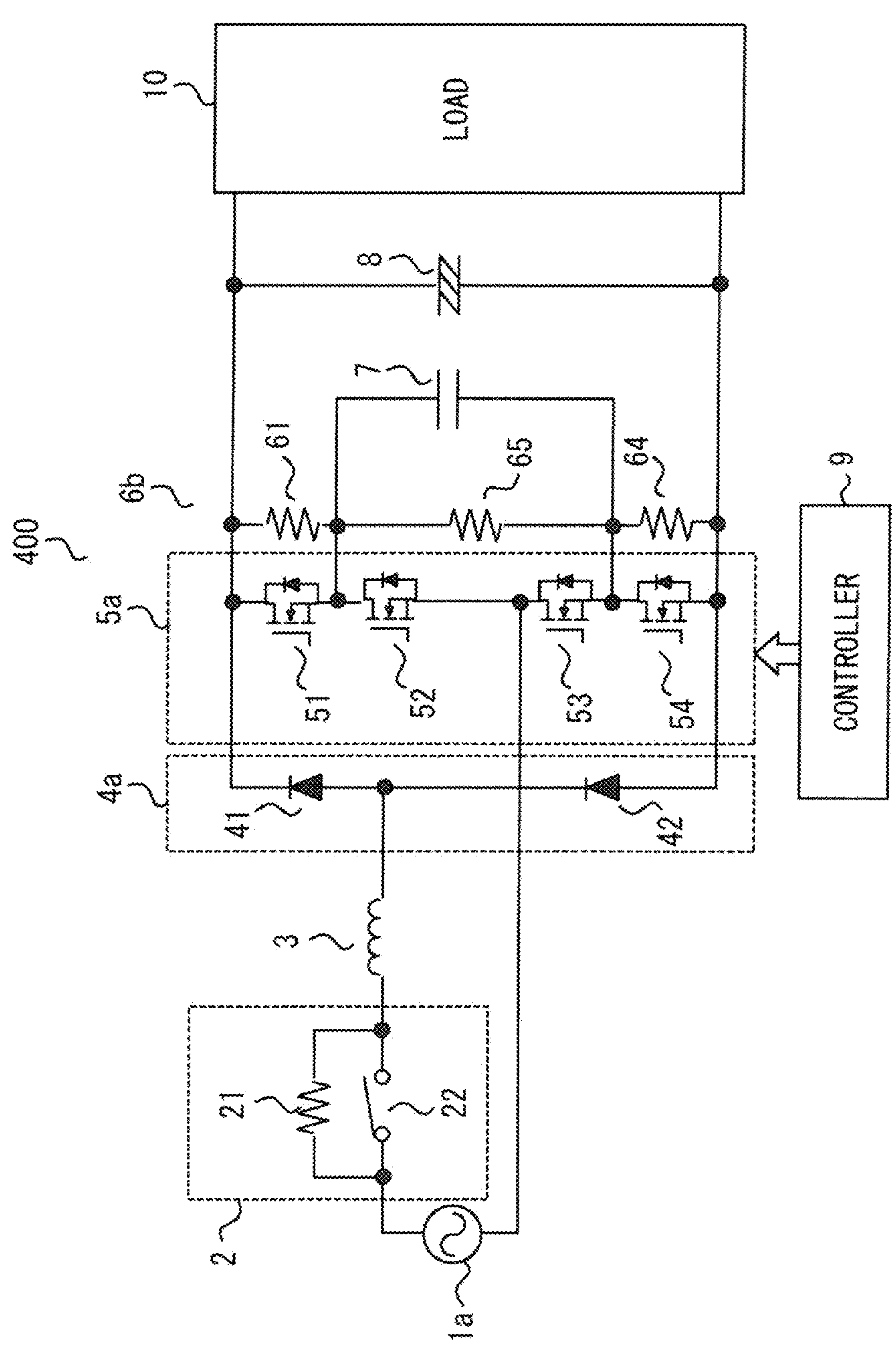
FIG. 24 is a circuit configuration diagram of a power conversion device according to embodiment 4.

In FIG. 24 in embodiment 4, the same or corresponding parts as those in embodiment 1 are denoted by the same reference characters.

For discrimination from embodiment 1, the power conversion device is denoted by 400.

In embodiment 4, difference from embodiment 1 is that the balance resistor is changed from a four-resistor configuration to a three-resistor configuration. Specifically, four balance resistors 61 to 64 are replaced with three balance resistors 61, 64, 65.

The power conversion device 400 receives an input from the single-phase AC power supply 1*a*, includes the inrush preventing circuit 2 including the current limiting resistor 21 and the switch 22, the reactor 3, the diode rectification circuit 4*a* with only one arm, the leg circuit 5*a* including a series circuit of the semiconductor switching elements 51, 52 in the upper leg and a series circuit of the semiconductor switching elements 53, 54 in the lower leg, the balance resistor 6*b* including the balance resistors 61, 64, 65, the charge/discharge capacitor 7, and the smoothing capacitor 8, and has an output to which the load 10 is connected. Further, the power conversion device 400 includes the controller 9 for driving the leg circuit 5*a*.

Connection among the leg circuit 5*a*, the balance resistor 6*b*, and the charge/discharge capacitor 7 will be described.

The balance resistor 61 is connected in parallel to the semiconductor switching element 51, and the balance resistor 64 is connected in parallel to the semiconductor switching element 54. The balance resistor 65 is connected in parallel to a series circuit of the semiconductor switching elements 52, 53.

The charge/discharge capacitor 7 is connected in parallel to the balance resistor 65 and the series circuit of the semiconductor switching elements 52, 53.

Connection among the single-phase AC power supply 1*a*, the inrush preventing circuit 2, the reactor 3, the diode rectification circuit 4*a* with only one arm, and the leg circuit Sa is the same as in embodiment 1 and therefore description thereof is omitted.

When the balance resistors 61, 64 and the balance resistor 65 need to be discriminated, the balance resistors 61, 64 are described as individual balance resistors, and the balance resistor 65 is described as a common balance resistor.

Also in the power conversion device 400 of embodiment 4 in which the balance resistor is changed to the three-resistor configuration, it is possible to suppress overshoot of the semiconductor switching element applied voltage by setting the factor Km to be small.

Depending on the relationship of the values of the balance resistors 61, 64 and the balance resistor 65, the difference between voltage of the charge/discharge capacitor 7 and voltage of the smoothing capacitor 8 changes.

It is inferred that, when the value of the balance resistor 65 is set to be two times the values of the balance resistors 61, 64, voltage of the charge/discharge capacitor 7 becomes ½ of voltage of the smoothing capacitor 8.

Figure 25:
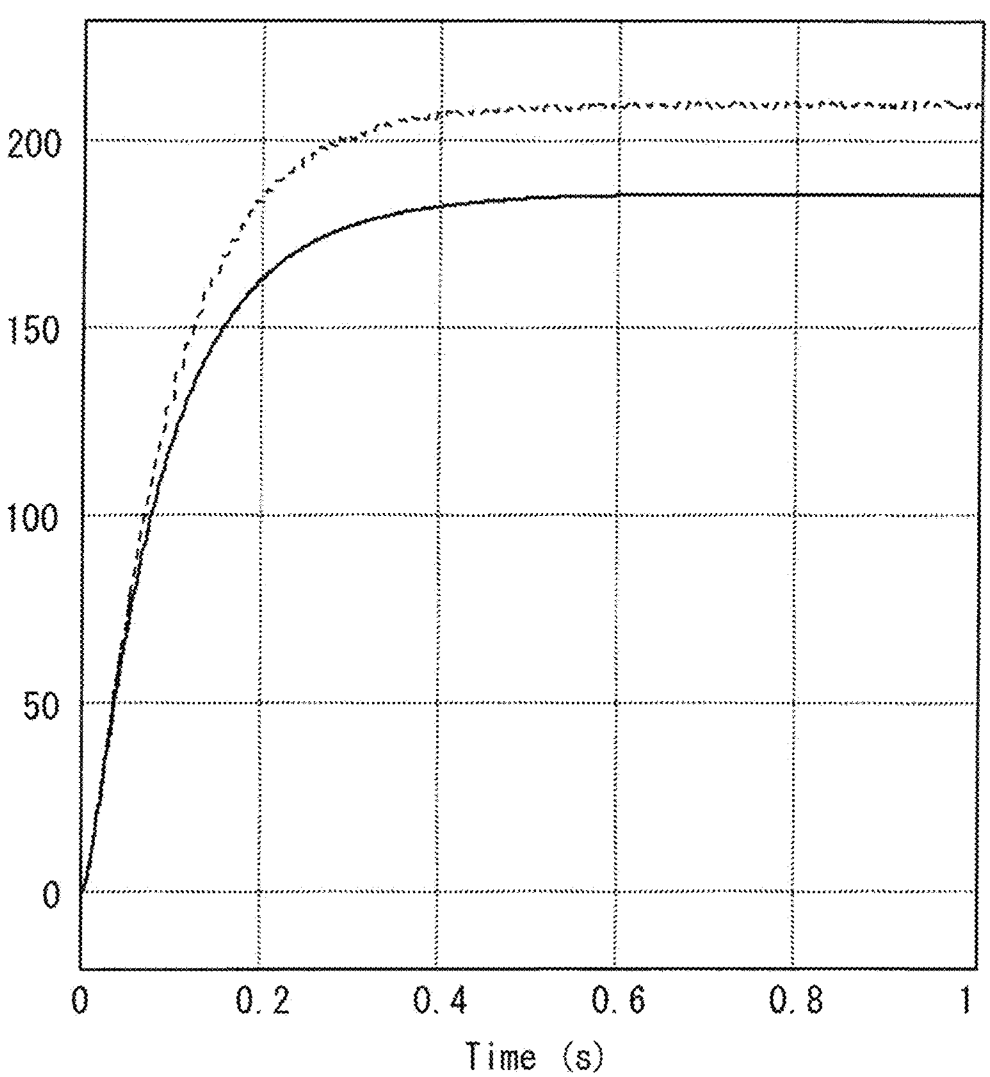
FIG. 25 shows comparison of the initial charging characteristic of the charge/discharge capacitor between a three-resistor configuration and a four-resistor configuration in the power conversion device according to embodiment 4.

FIG. 25 shows a result of measurement of a converged value of voltage of the charge/discharge capacitor 7 in a case where the resistance value R0 of the current limiting resistor is set at 10Ω, the resistance value Rf of the balance resistor is set at 10 kΩ, the capacitance Cf of the charge/discharge capacitor 7 is set at 10 pF, and the capacitance C0 of the smoothing capacitor 8 is set at 1000 F.

In FIG. 25, a solid line corresponds to the four-resistor configuration, and a dotted line corresponds to the three-resistor configuration.

In the case where the balance resistor has the four-resistor configuration, the converged value of voltage of the charge/discharge capacitor 7 is 187 V, but in the case where the balance resistor has the three-resistor configuration, the converged value increases to 210 V. This is relevant to a configuration in which the charge/discharge capacitor 7 is charged from the AC power supply side. A curve (solid line) in the four-resistor configuration in FIG. 25 is the same as the curve for 10 pF (solid line) in FIG. 8.

In a case of desiring to make voltage of the charge/discharge capacitor 7 be ½ of voltage of the smoothing capacitor, the value of the balance resistor 65 is set to be about 1.5 times the values of the balance resistors 61, 64. Thus, voltage of the charge/discharge capacitor 7 becomes ½ of voltage of the smoothing capacitor 8.

However, in the case where the above setting is made, there is a problem that voltage of the charge/discharge capacitor 7 does not become ½ of voltage of the smoothing capacitor 8 when the AC power supply side is interrupted by a circuit breaker or the like.

Therefore, in usage where both conditions at the time of turning on the power supply and at the time of interrupting the power supply need to be considered, adopting the four-resistor configuration having four balance resistors as in embodiments 1 to 3 provides a higher effect of suppressing overvoltage.

Also in the configurations of the power conversion devices according to embodiments 2 and 3, the balance resistor can be changed from the four-resistor configuration to the three-resistor configuration.

In a case of applying the three-phase AC power supply in embodiment 3, if voltage of the charge/discharge capacitor 7 is desired to be ½ of voltage of the smoothing capacitor 8, the value of the balance resistor 65 is set to be about 1.1 times the values of the balance resistors 61, 64. Thus, voltage of the charge/discharge capacitor 7 becomes ½ of voltage of the smoothing capacitor 8.

In the power conversion device 400 of embodiment 4, the value of the balance resistor 65 is set to be two times the values of the balance resistors 61, 64, whereby, as compared to the power conversion device of embodiment 1 having the four-resistor configuration, the effect of reducing peak voltages applied to the semiconductor switching elements 51, 54 becomes small but the peak voltages can be reduced. Thus, overvoltage of the semiconductor switching elements 51, 54 in initial charging can be suppressed.

In the power conversion device 400 of embodiment 4, since overvoltage can be suppressed in initial charging, the semiconductor switching elements can be formed by lower-withstand-voltage elements. Thus, cost increase is suppressed, high-efficiency elements can be selected, and a higher-efficiency power converter can be obtained.

Further, since the power conversion device 400 of embodiment 4 can be configured with three balance resistors, the power conversion device can be obtained at lower cost.

As described above, in the power conversion device of embodiment 4, the balance resistor is changed to the three-resistor configuration.

Thus, the power conversion device of embodiment 4 can suppress overvoltage during initial charging when the power supply is turned on, during operation, and in a stopped state.

Embodiment 5

In a power conversion device of embodiment 5, three semiconductor switching elements are connected in series in each of the upper leg and the lower leg of the leg circuit.

The configuration and operation of the power conversion device according to embodiment 5 will be described focusing on difference from embodiment 1, with reference to FIG. 26 which is a configuration diagram of the power conversion device and FIG. 27 which is a graph in which maximum voltage applied to the semiconductor switching element is plotted with respect to change in the overvoltage degree index.

Figure 26:
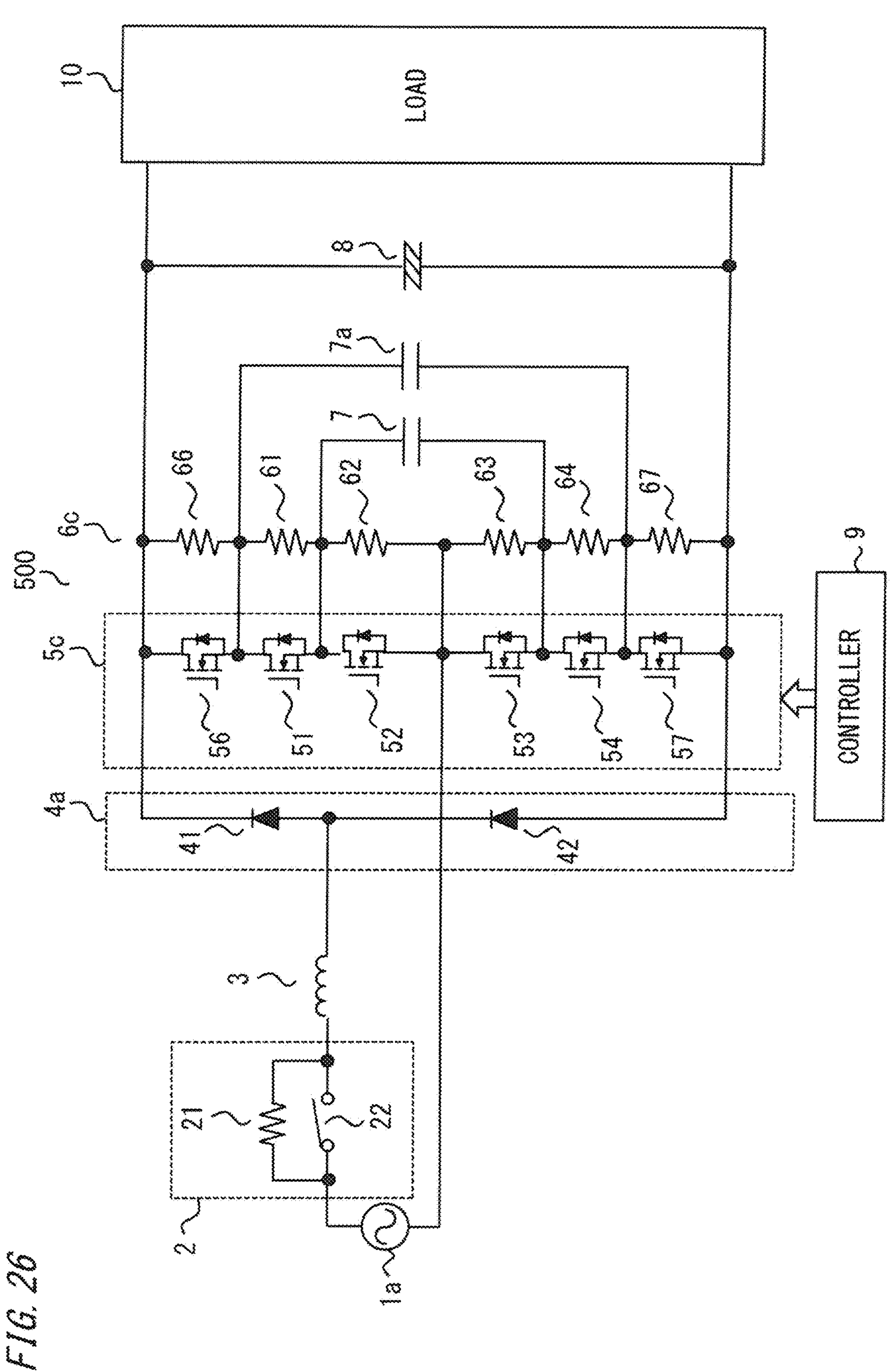
FIG. 26 is a circuit configuration diagram of a power conversion device according to embodiment 5.

In FIG. 26 in embodiment 5, the same or corresponding parts as those in embodiment 1 are denoted by the same reference characters.

For discrimination from embodiment 1, the power conversion device is denoted by 500.

In embodiment 5, difference from embodiment 1 is that the number of semiconductor switching elements connected in series in each of the upper leg and the lower leg of a leg circuit 5*c* is three. Along with this configuration change, the numbers of the balance resistors and the charge/discharge capacitors are also increased.

The power conversion device 500 receives an input from the single-phase AC power supply 1*a*, includes the inrush preventing circuit 2 including the current limiting resistor 21 and the switch 22, the reactor 3, the diode rectification circuit 4*a* with only one arm, the leg circuit 5*c* including a series circuit of semiconductor switching elements 56, 51, 52 in an upper leg and a series circuit of semiconductor switching elements 53, 54, 57 in a lower leg, a balance resistor 6*c* including resistors 66, 61, 62, 63, 64, 67, charge/discharge capacitors 7, 7*a*, and the smoothing capacitor 8, and has an output to which the load 10 is connected. Further, the power conversion device 500 includes the controller 9 for driving the leg circuit 5*c*.

Connection among the leg circuit 5*c*, the balance resistor 6*c*, and the charge/discharge capacitors 7, 7*a* will be described.

Regarding the upper leg, the balance resistors 66, 61, 62 are connected in parallel to the respective semiconductor switching elements 56, 51, 52. Regarding the lower leg, the balance resistors 63, 64, 67 are connected in parallel to the respective semiconductor switching elements 53, 54, 57.

The charge/discharge capacitor 7 is connected in parallel to a series circuit of the semiconductor switching elements 52, 53, that is, in parallel to a series circuit of the balance resistors 62, 63.

The charge/discharge capacitor 7*a* is connected in parallel to a series circuit of the semiconductor switching elements 51, 52, 53, 54, that is, in parallel to a series circuit of the balance resistors 61, 62, 63, 64.

Connection among the single-phase AC power supply 1*a*, the inrush preventing circuit 2, the reactor 3, the diode rectification circuit 4*a* with only one arm, and the leg circuit 5*c* is basically the same as in embodiment 1 and therefore description thereof is omitted.

In the power conversion device 500 of embodiment 5, when the balance of the charging times of the smoothing capacitor 8 and the charge/discharge capacitors 7, 7*a* is lost, overvoltage is applied to the semiconductor switching elements. When the balance is lost, the semiconductor switching elements to which overvoltage is particularly likely to be applied are the uppermost semiconductor switching element 56 in the upper leg and the lowermost semiconductor switching element 57 in the lower leg. Difference voltage between the smoothing capacitor 8 and the charge/discharge capacitor 7*a* is applied to the semiconductor switching elements 56, 57. Overshoot of this voltage needs to be suppressed.

When the balance resistors 66, 61, 62, 63, 64, 67 have the same resistance value, the overvoltage suppression effect is high. Here, the average value of the resistances of the balance resistors 66, 61, 62, 63, 64, 67 is denoted by Rf.

The capacitances of the charge/discharge capacitor 7 and the charge/discharge capacitor 1*a* can be set at different values, but here, they are set at the same value and denoted by Cf. Further, the resistance value of the current limiting resistor 21 is denoted by R0 and the capacitance of the smoothing capacitor is denoted by C0.

The factors Kf, K0, Km can be defined in the same manner as in embodiment 1.

Figure 27:
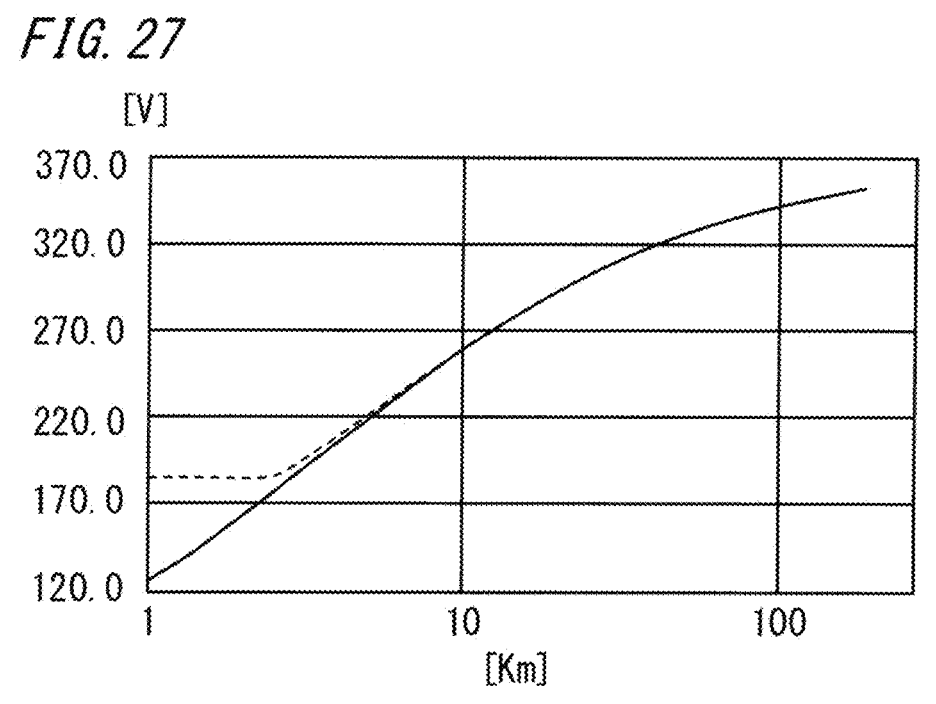

FIG. 27 shows a graph in which the factor Km which is the overvoltage degree index and maximum voltage applied to the semiconductor switching elements 56, 57 are plotted.

In FIG. 27, the horizontal axis indicates the factor Km and the vertical axis indicates maximum voltage [V] across the semiconductor switching element.

In FIG. 27, a solid line shows a case where three semiconductor switching elements are connected in series in each of the upper leg and the lower leg in the power conversion device 500 of embodiment 5. A dotted line shows a case where two semiconductor switching elements are connected in series in each of the upper leg and the lower leg in the power conversion device 100 of embodiment 1.

Both cases exhibit similar values in a range where the factor Km is not less than about 3, but in the case where three semiconductor switching elements are connected in series, voltage applied to the switching element is ⅓ of voltage of the smoothing capacitor 8, and therefore, when the factor Km is further decreased, overshoot of voltage is suppressed.

Figure 1:
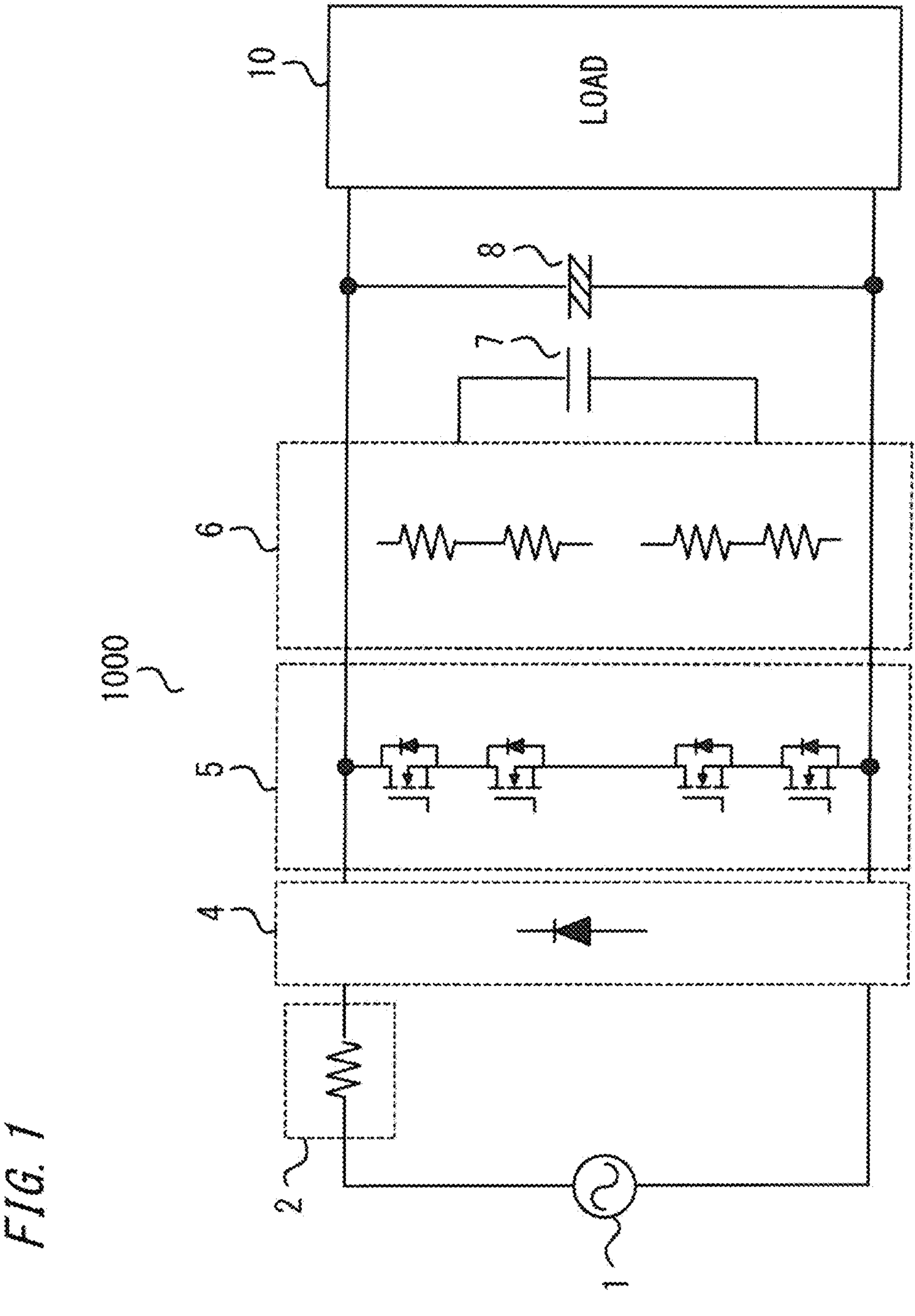
FIG. 1 is a basic configuration diagram of a power conversion device according to embodiment 1.

In the above description, the case where three semiconductor switching elements are connected in series in each of the upper leg and the lower leg in the circuit configuration in FIG. 1 in embodiment 1, has been described. Also in the circuit configurations in FIG. 14 to FIG. 16, FIG. 17, and FIG. 18 which are the circuit configurations in embodiments 2 and 3, a configuration of connecting three semiconductor switching elements in series can be adopted.

In a case where the bridge rectification circuit 4*b* or 4*c* is used as the rectification circuit 4, the semiconductor switching elements in the upper leg can be replaced with diodes as in the power conversion devices 201 (FIG. 15) and 202 (FIG. 16) of embodiment 2 and the power conversion device 301 (FIG. 18) of embodiment 3.

Even in a case where the number of balance resistors is decreased as in embodiment 4, the number of semiconductor switching elements connected in series can be increased. In this case, in FIG. 26, the balance resistors 62, 63 may be replaced with one balance resistor, whereby the number of the balance resistors can be decreased to five.

In embodiment 5, the case where three semiconductor switching elements connected in series in each of the upper leg and the lower leg has been described. However, a configuration of connecting four or five semiconductor switching elements in series in each of the upper leg and the lower leg may be adopted.

In the power conversion device 500 of embodiment 5, also in the case where the number of the semiconductor switching elements connected in series in each of the upper leg and the lower leg is increased, application of overvoltage to the semiconductor switching elements in initial charging is suppressed.

In the power conversion device 500 of embodiment 5, since overvoltage can be suppressed in initial charging, the semiconductor switching elements can be formed by lower-withstand-voltage elements. Thus, cost increase is suppressed, high-efficiency semiconductor switching elements can be selected, and a higher-efficiency power converter can be obtained.

As described above, in the power conversion device of embodiment 5, three semiconductor switching elements are connected in series in each of the upper leg and the lower leg of the leg circuit.

Thus, the power conversion device of embodiment 5 can suppress overvoltage during initial charging when the power supply is turned on, during operation, and in a stopped state.

Figure 28:
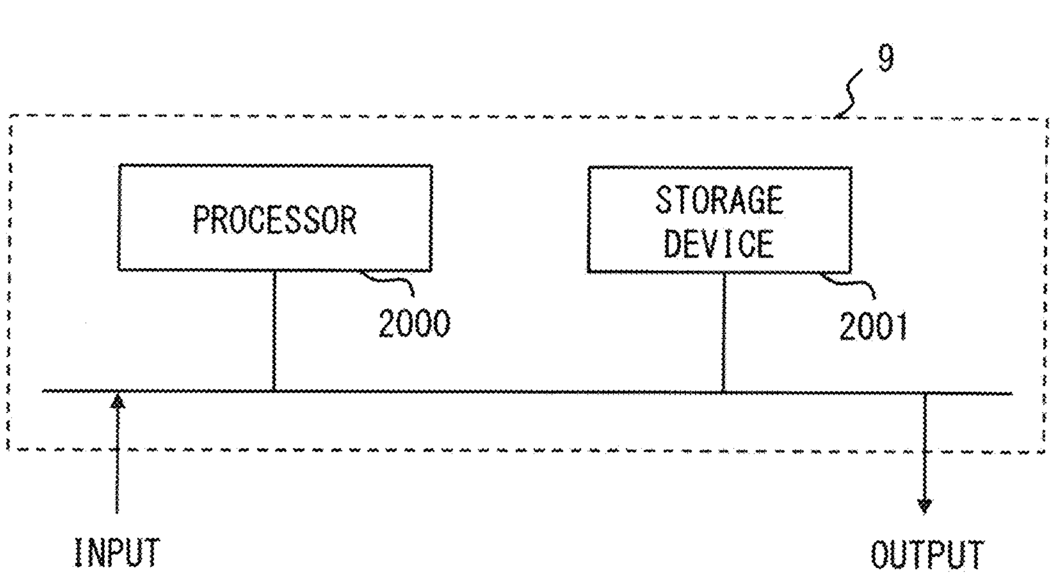
FIG. 28 is a block diagram showing a hardware configuration example of a controller of the power conversion device.

Here, FIG. 28 shows an example of hardware of the controller 9 of the power conversion device. As shown in FIG. 28, the controller 9 is composed of a processor 2000 and a storage device 2001. Although not shown, the storage device is provided with a volatile storage device such as a random access memory and a nonvolatile auxiliary storage device such as a flash memory.

An auxiliary storage device of a hard disk may be provided instead of the flash memory. The processor 2000 executes a program inputted from the storage device 2001. In this case, the program is inputted from the auxiliary storage device to the processor 2000 via the volatile storage device. The processor 2000 may output data such as a calculation result to the volatile storage device of the storage device 2001, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 AC power supply
1*a* single-phase AC power supply
1*b* three-phase AC power supply
2 inrush preventing circuit
21 current limiting resistor
22 switch
3 reactor
4 rectification circuit
4*a* diode rectification circuit with only one arm
4*b*, 4*c* bridge rectification circuit
41, 42 diode
5, 5*a*, 5*b*, 5*c* leg circuit
51, 52, 53, 54, 56, 57 semiconductor switching element
51*a*, 52*a* diode
6, 6*a*, 6*b*, 60 balance resistor
61, 62, 63, 64, 65, 66, 67 balance resistor

7, 7*a* charge/discharge capacitor
8 smoothing capacitor
9 controller
10 load
100, 200, 201, 202, 300, 301, 400, 500, 1000 power conversion device
2000 processor
2001 storage device

The invention claimed is:

1. A power conversion device comprising:

a rectification circuit which is connected to an AC power supply and rectifies input voltage from the AC power supply;

a leg circuit connected to the rectification circuit and having an upper leg includes plurality of semiconductor elements connected in series and a lower leg includes a plurality of semiconductor elements connected in series, the upper leg and the lower leg being connected in series, at least the plurality of semiconductor elements in the lower leg being switching elements;

a plurality of balance resistors connected in parallel to the semiconductor elements of the leg circuit;

at least one charge/discharge capacitor connected between a connection point of the semiconductor elements in the upper leg and a connection point of the semiconductor elements in the lower leg;

a smoothing capacitor connected to an output of the leg circuit; and an inrush preventing circuit provided between the AC power supply and the leg circuit, and including a current limiting resistor, wherein:

when charging speed of the charge/discharge capacitor is represented as a factor Kf and charging speed of the smoothing capacitor is represented as a factor K0 , a factor Km, which is defined by Kf/K0, is set to be smaller than 100 to suppress overvoltage applied on the semiconductor elements when the AC power supply is turned on, the factor Kf is obtained by a product of an average value of resistance values of the plurality of balance resistors and a capacitance value of the charge/discharge capacitor, and the factor K0 is obtained by a product of a resistance value of the current limiting resistor and a capacitance value of the smoothing capacitor.

2. The power conversion device according to claim 1, wherein:

the AC power supply is a single-phase AC power supply, the rectification circuit is a diode rectification circuit with only one arm, and the plurality of balance resistors are connected in parallel to the respective semiconductor elements of the leg circuit.

3. The power conversion device according to claim 1, wherein:

the AC power supply is a single-phase AC power supply, the rectification circuit is a bridge rectification circuit, and the plurality of balance resistors are connected in parallel to the respective semiconductor elements of the leg circuit.

4. The power conversion device according to claim 1, wherein:

the AC power supply is a single-phase AC power supply, the rectification circuit is a diode rectification circuit with only one arm, and the plurality of balance resistors includes:

one common balance resistor connected in parallel to a series circuit of the semiconductor element at a lowermost position in the upper leg and the semiconductor element at an uppermost position in the lower leg, and individual balance resistors connected in parallel to each semiconductor element of the upper leg and each semiconductor element of the lower leg other than the semiconductor elements to which the common balance resistor is connected.

5. The power conversion device according to claim 1, wherein:

the AC power supply is a single-phase AC power supply, the rectification circuit is a bridge rectification circuit, and the plurality of balance resistors includes:

one common balance resistor connected in parallel to a series circuit of the semiconductor element at a lowermost position in the upper leg and the semiconductor element at an uppermost position in the lower leg, and individual balance resistors connected in parallel to each semiconductor element of the upper leg and each semiconductor element of the lower leg other than the semiconductor elements to which the common balance resistor is connected.

6. The power conversion device according to claim 1, wherein:

the AC power supply is a three-phase AC power supply, the rectification circuit is a bridge rectification circuit, and the plurality of balance resistors are connected in parallel to the respective semiconductor elements of the leg circuit.

7. The power conversion device according to claim 1, wherein:

the AC power supply is a three-phase AC power supply, the rectification circuit is a bridge rectification circuit, and the plurality of balance resistors includes:

one common balance resistor connected in parallel to a series circuit of the semiconductor element at a lowermost position in the upper leg and the semiconductor element at an uppermost position in the lower leg, and individual balance resistors connected in parallel to each semiconductor element of the upper leg and each semiconductor element of the lower leg other than the semiconductor elements to which the common balance resistor is connected.

8. The power conversion device according to claim 1, wherein:

the AC power supply is a single-phase AC power supply, the rectification circuit is a diode rectification circuit in which two diodes are connected in series, one end of the single-phase AC power supply is connected to a connection point of the two diodes, and another end of the single-phase AC power supply is connected to a connection point of the upper leg and the lower leg of the leg circuit.

* * * * *